United States Patent
Suzuki

(10) Patent No.: US 10,840,768 B2
(45) Date of Patent: Nov. 17, 2020

(54) DRIVE DEVICE FOR VEHICLE WITH STATOR COIL TEMPERATURE DETECTOR

(71) Applicant: NTN CORPORATION, Osaka (JP)

(72) Inventor: Kenichi Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/124,870

(22) Filed: Sep. 7, 2018

(65) Prior Publication Data

US 2019/0001826 A1 Jan. 3, 2019

Related U.S. Application Data

(63) Continuation of application No. PCT/JP2017/008777, filed on Mar. 6, 2017.

(30) Foreign Application Priority Data

Mar. 8, 2016 (JP) ................... 2016-044076

(51) Int. Cl.
| | |
|---|---|
| *H02K 7/14* | (2006.01) |
| *H02K 9/19* | (2006.01) |
| *H02K 11/25* | (2016.01) |
| *B60L 50/16* | (2019.01) |
| *B60W 10/08* | (2006.01) |
| *B60W 20/00* | (2016.01) |

(52) U.S. Cl.
CPC ............ *H02K 7/14* (2013.01); *B60L 50/16* (2019.02); *B60W 10/08* (2013.01); *B60W 20/00* (2013.01); *H02K 9/19* (2013.01); *H02K 11/25* (2016.01); *B60L 2240/36* (2013.01); *Y02T 10/641* (2013.01); *Y02T 10/7077* (2013.01)

(58) Field of Classification Search
CPC . H02K 11/25; H02K 9/19; H02K 9/00; H02K 5/12; B60L 11/14; B60L 2240/36; B60W 10/08; B60W 20/00
USPC ............................................ 310/54–62, 68 C
See application file for complete search history.

(56) References Cited

U.S. PATENT DOCUMENTS

| | | | |
|---|---|---|---|
| 8,247,934 B2 | 8/2012 | Matsui et al. | |
| 8,552,603 B2 * | 10/2013 | Minemura | ............... H02K 9/19 310/54 |
| 9,263,927 B2 | 2/2016 | Marschall et al. | |

(Continued)

FOREIGN PATENT DOCUMENTS

| | | |
|---|---|---|
| JP | 2005-229672 | 8/2005 |
| JP | 2009-126189 | 6/2009 |

(Continued)

OTHER PUBLICATIONS

JP 201404521 English Translation.*

(Continued)

*Primary Examiner* — Maged M Almawri

(57) ABSTRACT

An electric motor includes a housing, a stator, and a rotor. The stator is composed of a stator core and a stator coil. The stator coil is composed of a plurality of individual coils provided to teeth of the stator core. The housing has lubricating oil supply portion, through which the lubricating oil is supplied onto coil ends of upper individual coils. A temperature detector for detecting the temperature of the stator coil is disposed at a position lower than an axis of a rotor and higher than an oil level of the lubricating oil accumulated in the bottom portion of the housing.

5 Claims, 15 Drawing Sheets

(56) References Cited

U.S. PATENT DOCUMENTS

| | | | |
|---|---|---|---|
| 9,343,943 B2 | 5/2016 | Hattori | |
| 2005/0285457 A1 | 12/2005 | Tsutsui et al. | |
| 2010/0264760 A1* | 10/2010 | Matsui | H02K 9/19 310/54 |
| 2011/0156508 A1* | 6/2011 | Minemura | H02K 9/193 310/54 |
| 2013/0320817 A1 | 12/2013 | Marschall et al. | |
| 2014/0191696 A1 | 7/2014 | Hattori | |
| 2015/0042184 A1* | 2/2015 | Matsumoto | H02K 9/19 310/53 |
| 2016/0204679 A1 | 7/2016 | Yamada | |
| 2017/0197502 A1 | 7/2017 | Yukishima et al. | |

FOREIGN PATENT DOCUMENTS

| | | |
|---|---|---|
| JP | 2010-259145 | 11/2010 |
| JP | 2012-217303 | 11/2012 |
| JP | 2012-223085 | 11/2012 |
| JP | 2013-207957 | 10/2013 |
| JP | 2014-204521 | 10/2014 |
| JP | 2014-209817 | 11/2014 |
| JP | 5811755 | 11/2015 |
| JP | 2016-86495 | 5/2016 |
| WO | WO2012/052208 | 4/2012 |
| WO | WO 2013/014523 A2 | 1/2013 |
| WO | WO 2015/045903 A1 | 4/2015 |
| WO | WO 2015/186466 A1 | 12/2015 |

OTHER PUBLICATIONS

JP2012217303A English Translation.*
JP5957184B2 English Translation.*
International Search Report dated Apr. 25, 2017 in corresponding International Patent Application No. PCT/JP2017/008777.
English Translation by WIPO of the International Preliminary Report on Patentability dated Sep. 20, 2018 in corresponding International Patent Application No. PCT/JP2017/008777, 9 pgs.
Extended European Search Report dated Sep. 18, 2019 in corresponding European Patent Application No. 17763177.7.
Chinese Office Action dated Sep. 27, 2019 in corresponding Chinese Patent Application No. 201780015961.1.
Communication Pursuant to Article 94(3) EPC, dated Apr. 30, 2020, in corresponding European Application No. 17763177.7.
Office Action, dated May 27, 2020, in corresponding Chinese Application No. 201780015961.1 (18 pp.).

* cited by examiner

US 10,840,768 B2

DRIVE DEVICE FOR VEHICLE WITH STATOR COIL TEMPERATURE DETECTOR

CROSS REFERENCE TO THE RELATED APPLICATION

This application is a continuation application, under 35 U.S.C. § 111(a), of international application No. PCT/JP2017/008777, filed Mar. 6, 2017, which is based on and claims Convention priority to Japanese patent application No. 2016-044076, filed Mar. 8, 2016, the entire disclosure of which is herein incorporated by reference as a part of this application.

BACKGROUND OF THE INVENTION

Field of the Invention

The present invention relates to a drive device for vehicles or vehicle drive device using an electric motor such as an in-wheel motor, for example. In particular, the present invention relates to a technology for cooling a stator with lubricating oil supplied from an upper portion of a housing.

Description of Related Art

Electric motors are widely used in vehicles, industrial machines, or the like, and are required to have small size, light weight, high efficiency, and high output. Meanwhile, the output of an electric motor is restricted by the temperature of the electric motor. Accordingly, in order to improve the output of the electric motor, it is essential to inhibit an increase in temperature of the electric motor.

A major heat generation source in an electric motor is a stator coil. Therefore, the capability of cooling the stator coil significantly influences on the motor rating. For the purpose of improving the capability of cooling the stator, various structures using lubricating oil as a cooling oil have been proposed.

Meanwhile, when the stator coil is energized to rotate a rotor, Joule's heat is generated in the stator coil, which may melt an insulating film of the stator coil to be wound around a stator core, causing insulation failure. Further, the high temperature of Joule's heat may decrease the magnetic force of a magnet of the rotor. Therefore, the temperature of the stator coil before being damaged by the high temperature is detected and monitored.

For example, the following technologies for detecting the temperature of the stator coil have been proposed.

(1) Patent Document 1

This document has proposed a structure in which, in order to detect heat generation in coils of a stator of an electric rotary machine, a temperature sensor for detecting the temperature of the coils is disposed between coils provided at a highest-temperature position in an upper portion of a stator core, and moreover, a cooling oil scooped up by a rotor is hardly splashed onto the temperature sensor.

(2) Patent Document 2

This document has proposed, as a technology for appropriately detecting the temperature of an oil-cooled stator coil, a structure in which a mechanism for positioning is mounted to a cover that prevents a coolant from flowing into a contact point between a thermistor and the stator coil.

RELATED DOCUMENT

Patent Document

[Patent Document 1] JP Laid-open Patent Publication No. 2014-204521

[Patent Document 2] JP Laid-open Patent Publication No. 2012-223085

Generally, the cooling capability of an electric motor can be improved by supplying a sufficiently cooled coolant to the electric motor. However, in the case where the electric motor is an in-wheel motor that is used around the suspension of a vehicle, size reduction and weight reduction thereof are indispensable, and it is difficult to install piping for introducing a coolant from the outside to cool the electric motor.

Therefore, in the electric motor, such as the in-wheel motor, required to be reduced in size and weight, an internal circulation system for circulating lubricating oil in the electric motor has been adopted. Examples of the internal circulation system include: a system for scooping up or spattering lubricating oil accumulated in a bottom portion of a housing, by using centrifugal force accompanying rotation of a rotor; and a system for jetting and diffusing lubricating oil from a rotor shaft. In either system, however, it is uncertain whether all the scooped-up or spattered lubricating oil or the diffused lubricating oil has reached the stator coil.

For the purpose of cooling the stator coil more reliably as compared with the conventional internal circulation system described above, an improved version of internal circulation system has been devised in which lubricating oil is supplied from above a coil end of a stator coil, e.g., a portion of the coil projecting outward from the stator core (e.g., JP Laid-open Patent Publication No. 2016-086495). In this improved version of internal circulation system, as shown in FIGS. 17 and 18, lubricating oil is diffused from a rotor shaft 106 into a housing 108, and moreover, oil holes 170, 171 are provided in an upper portion of the housing 108, and lubricating oil supplied by a built-in pump 150 is supplied to coil ends 133a of upper individual coils 133 through the oil holes 170, 171.

JP Laid-open Patent Publication No. 2016-086495 also discloses a structure in which, as shown in FIG. 19 and FIG. 20, a guide plate 172 is provided between each oil hole 170, 171 and the coil ends 133a, and the lubricating oil supplied through the oil hole 170, 171 is dispersed in the circumferential direction and supplied to the coil ends 133a. The guide plate 172 has a plurality of communication holes 173 (FIG. 20) formed at intervals in the circumferential direction.

As described above, when the lubricating oil is supplied from above the coil ends 133a, the coil ends 133a can be cooled also from an outer diameter surface side, thereby enhancing the cooling effect. It is noted that FIG. 17 and FIG. 19 each shows a wheel drive device or vehicle drive device in which an electric motor 101, a reducer 102, and a wheel bearing 105 are combined.

When a current supplied to a stator coil 131 is controlled, it is necessary to detect the temperature of an individual coil 133 having the highest temperature among the plurality of individual coils 133. However, it is difficult to specify the individual coil 133 having the highest temperature from the plurality of individual coils 133. When the lubricating oil is used for cooling the stator coil 131, if a temperature sensor 175 for detecting the temperature of the stator coil 131 is affected by the lubricating oil, it is difficult to detect the actual temperature of the coil.

In the electric motor including the cooling mechanism composed of to the above-mentioned improved version of internal circulation system, as shown in FIG. 18 and FIG. 20, for example, the temperature sensor 175 for detecting the temperature of the stator coil is disposed in a gap 176 between individual coils 133 adjacent to each other in the circumferential direction, so that the temperature sensor 175 is hardly affected by the lubricating oil that flows through the coil ends 133a of the respective individual coils 133. Although it is empirically decided that the temperature sensor 175 is disposed at a position higher than an oil level 166 of the lubricating oil accumulated in a bottom portion of the housing 108, sincere consideration has not been given about which of the gaps between adjacent individual coils 133 is optimum to be used as a gap in which the temperature sensor 175 should be disposed.

Also in Patent Document 1, in order to detect heat generation in the coils of the stator of the electric rotary machine, a temperature sensor for detecting the temperature of the coils is provided. This temperature sensor is disposed between coils provided at the highest-temperature position in an upper portion of the stator core, and moreover, the cooling oil scooped up by the rotor is hardly circulated, in other words, the cooling oil is hardly splashed onto the temperature sensor, and therefore the temperature sensor is hardly affected by the cooling oil. Thus, influence of the cooling oil scooped up by the rotor on cooling of the stator, has been considered. However, as shown in FIG. 17 and FIG. 18, or FIG. 19 and FIG. 20, when the cooling oil is supplied from above the coil end of the stator coil, an upper portion of the stator is positively cooled, and the temperature sensor disposed in the upper portion of the stator core cannot detect the highest temperature of the stator coil.

Patent Document 2 has proposed, as the technology for appropriately detecting the temperature of the oil-cooled stator coil, the structure in which the mechanism for positioning is mounted to the cover that covers the contact portion between the thermistor and the stator coil to prevent the coolant from flowing into the contact portion. When the coolant is supplied from above the stator, an upper portion of the stator is more cooled and therefore has a lower coil temperature, and the coil temperature is gradually increased toward a lower portion of the stator. Disposing the temperature sensor in the middle of the flow of the cooling oil is not preferable in terms of detection of a portion having the highest coil temperature.

SUMMARY OF THE INVENTION

An object of the present invention is to provide a vehicle drive device that is able to efficiently cool a stator coil of a horizontally-mounted electric motor with lubricating oil supplied from an upper portion of a housing, that is hardly affected by the supplied lubricating oil and the lubricating oil accumulated in the bottom portion of the housing, and that is able to detect the highest temperature of the stator coil.

A vehicle drive device according to the present invention includes: a wheel bearing configured to support a wheel; a horizontally-mounted electric motor configured to rotate a rotating ring of the wheel bearing; and an oil supply mechanism configured to cool the electric motor with lubricating oil.

The electric motor includes: a housing; a stator provided inside the housing; and a rotor configured to be rotatable with respect to the stator. The stator is composed of a stator core and a stator coil. The stator core has a plurality of teeth arranged in a circumferential direction around an axis of the rotor. The stator coil is composed of a plurality of individual coils provided on the respective teeth. The oil supply mechanism has a lubricating oil supply portion configured to supply lubricating oil onto coil ends of upper individual coils among the plurality of individual coils. A lower portion of the stator is immersed in the lubricating oil accumulated in a bottom portion of the housing. A temperature detector configured to detect a temperature of the stator coil is disposed at a position that is lower than the axis of the rotor and higher than an oil level of the lubricating oil accumulated in the bottom portion of the housing.

According to this configuration, the lubricating oil supply portion supplies the lubricating oil onto the coil ends of the upper individual coils among the plurality of individual coils. The lubricating oil supplied onto the coil ends of the upper individual coils sequentially flows from the upper individual coils to lower individual coils along the coil ends of the respective individual coils. Meanwhile, the lubricating oil cools the respective individual coils. The upper individual coils, which are cooled by the lubricating oil that has just been supplied from the lubricating oil supply portion and does not have heat, are low in temperature, whereas the lower individual coils, which are cooled by the lubricating oil whose temperature has increased, are high in temperature. Therefore, the temperature detector, which is disposed at an appropriate position lower than the axis of the rotor, can detect the temperature of the individual coil having the highest temperature or substantially highest temperature.

The stator coil immersed in the lubricating oil has a temperature that follows the temperature of the lubricating oil. Therefore, if the temperature of an individual coil being immersed in the lubricating oil, among the plurality of individual coils, is regarded as the highest temperature, an accurate highest temperature cannot be obtained. The temperature detector, which is disposed at a position higher than the oil level of the lubricating oil accumulated in the bottom portion of the housing, can accurately detect the highest temperature of the stator coil.

In the present invention, the temperature detector is preferably located within a range of a gap between individual coils adjacent in the circumferential direction, except a portion between coil ends of the adjacent individual coils. As the lubricating oil flows along the coil ends of the respective individual coils, if the temperature detector is disposed between the coil ends of the adjacent individual coils, the temperature detector is likely to be affected by the lubricating oil. However, as in this configuration, when the temperature detector is located within a range of a gap between individual coils adjacent in the circumferential direction, except a portion between coil ends of the adjacent individual coils, the temperature detector is hardly affected by the lubricating oil, whereby the highest temperature of the stator coil can be accurately detected.

In the present invention, in the case where a lower end of the rotor has a height such that the rotor, in a normal state, is not immersed in the lubricating oil accumulated in the bottom portion of the housing whereas the rotor comes into contact with the lubricating oil when the oil level of the lubricating oil varies due to turning or abrupt acceleration/deceleration of a vehicle, the temperature detector is preferably disposed, in the housing, at a position on a side opposite to a side where the lower end of the rotor moves due to rotation of the rotor when the vehicle travels forward, with respect to the axis of the rotor. In the case where the lower end of the rotor has the above-mentioned height, the rotor may scoop up the lubricating oil when the oil level varies due to turning or abrupt acceleration/deceleration of the vehicle. The scooped-up lubricating oil is spattered in the direction in which the lower end of the rotor moves. If the temperature detector is disposed at a position on the side opposite to the side where the lower end of the rotor moves, with respect to the axis of the rotor, the scooped-up lubricating oil is not applied to the temperature detector. Since forward traveling of the vehicle is significantly higher in frequency than backward traveling thereof, if the temperature detector is disposed at a position on the side opposite to the side where the lower end of the rotor moves due to rotation of the rotor when the vehicle travels forward, with respect to the axis of the rotor, most of the scooped-up lubricating oil is prevented from being applied to the temperature detector.

In the present invention, in the case where the lubricating oil supply portion has an oil hole provided in an upper portion of the housing and configured to discharge the lubricating oil downward, a guide plate may be provided between the oil hole and outer-diameter-side end surfaces of the upper individual coils. The guide plate is configured to distribute, in the to circumferential direction, the lubricating oil discharged from the oil hole, and supply the lubricating oil onto the coil ends of the upper individual coils. When the guide plate is provided, the lubricating oil discharged from the oil hole is temporarily received by the guide plate, and is distributed in the circumferential direction to be supplied onto the coil ends of the upper individual coils. Thus, the lubricating oil can be uniformly spread not only over an area directly below the oil hole, but also over a wide area of the upper individual coils.

In the present invention, the temperature detector is preferably covered with an insulating member. The insulating member is preferably made of resin, for example. When the temperature detector is covered with an insulating member, even if the lubricating oil is applied to the temperature detector, the temperature detector is hardly affected. In addition, resin has excellent coverability, and is easy to process.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
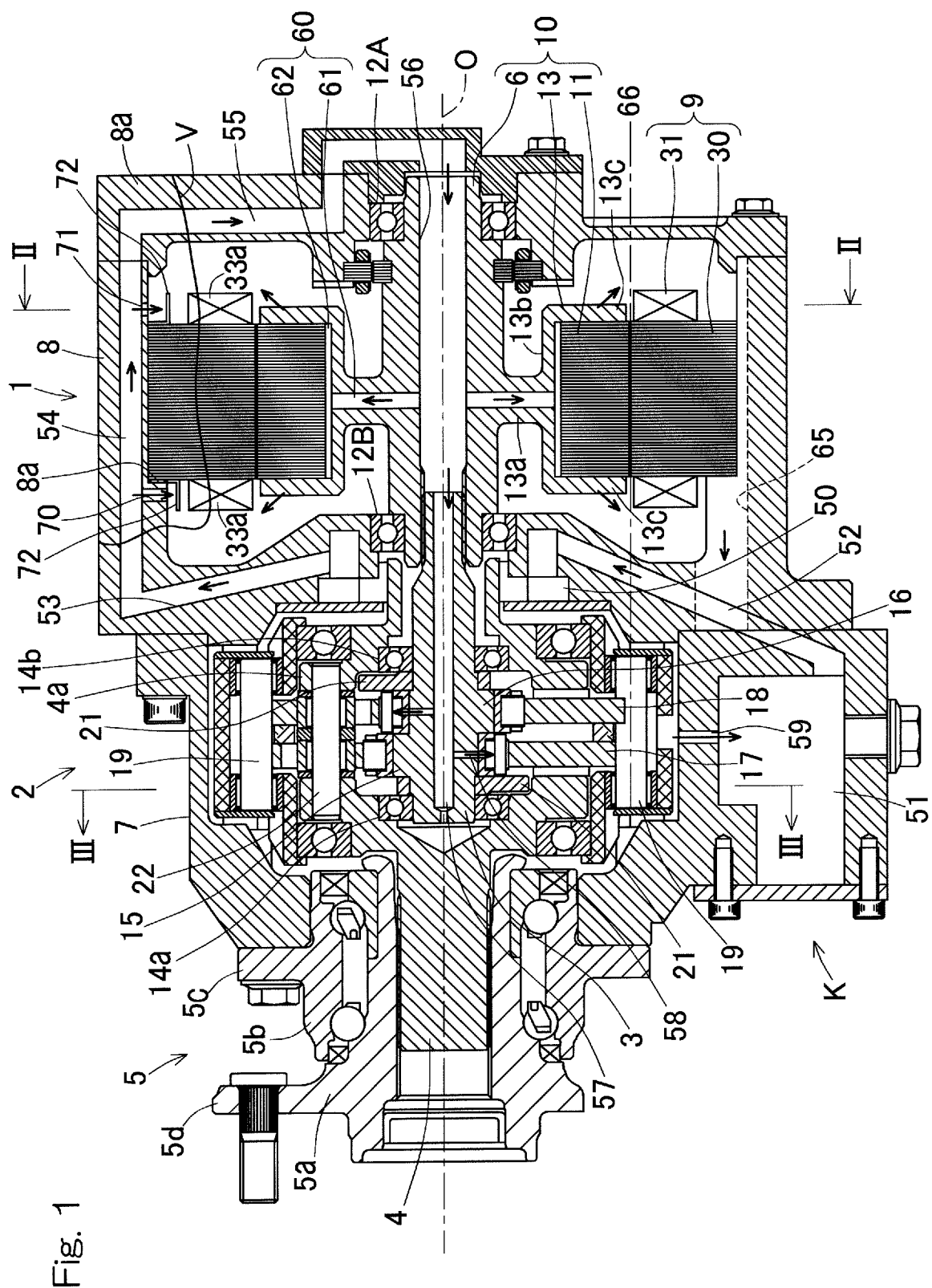
FIG. 1 is a longitudinal sectional view of a vehicle drive device according to one embodiment of the present invention.

A vehicle drive device according to one embodiment of the present invention will be described with reference to FIG. 1 to FIG. 5. As shown in FIG. 1, the vehicle drive device includes: an electric motor 1 that drives a wheel; a reducer or reduction gear 2 that reduces the speed of rotation (the number of rotation per unit time) of the electric motor 1; a wheel bearing 5 that is rotated by an output member 4 being coaxial with an input shaft 3 of the reducer 2 (hereinafter referred to as a reducer input shaft 3); and an oil supply mechanism K. The reducer 2 is interposed between the wheel bearing 5 and the electric motor 1, and a hub of a wheel being a drive wheel supported by the wheel bearing 5 is coaxially coupled with a rotor shaft 6. This vehicle drive device is an in-wheel type vehicle drive device, a portion or the entirety of which is disposed in a wheel, for example.

A suspension (not shown) of the vehicle is coupled with a reducer housing 7 that houses the reducer 2. It is noted that, in this specification, the term "outboard" represents one side of the vehicle body away from the longitudinal center of the vehicle body and the term "inboard" represents the other side of the vehicle body close to the longitudinal center of the vehicle body, when the vehicle drive device is assembled in the vehicle.

The electric motor 1 includes: a stator 9 fixed to a motor housing 8; and a rotor 10 that rotates around the rotor shaft 6. The electric motor 1 is an IPM motor (so-called interior permanent magnet synchronous motor) in which a radial gap is provided between the stator 9 and the rotor 10. The rotor shaft 6 is horizontally mounted (therefore, the electric motor 1 is referred to as a horizontally-mounted motor), and is rotatably supported by paired rolling bearings (ball bearings) 12A, 12B. The paired rolling bearings 12A, 12B are spaced apart from each other in the motor shaft direction. The motor shaft direction is a direction along an axis O of the rotor 10.

Figure 2:
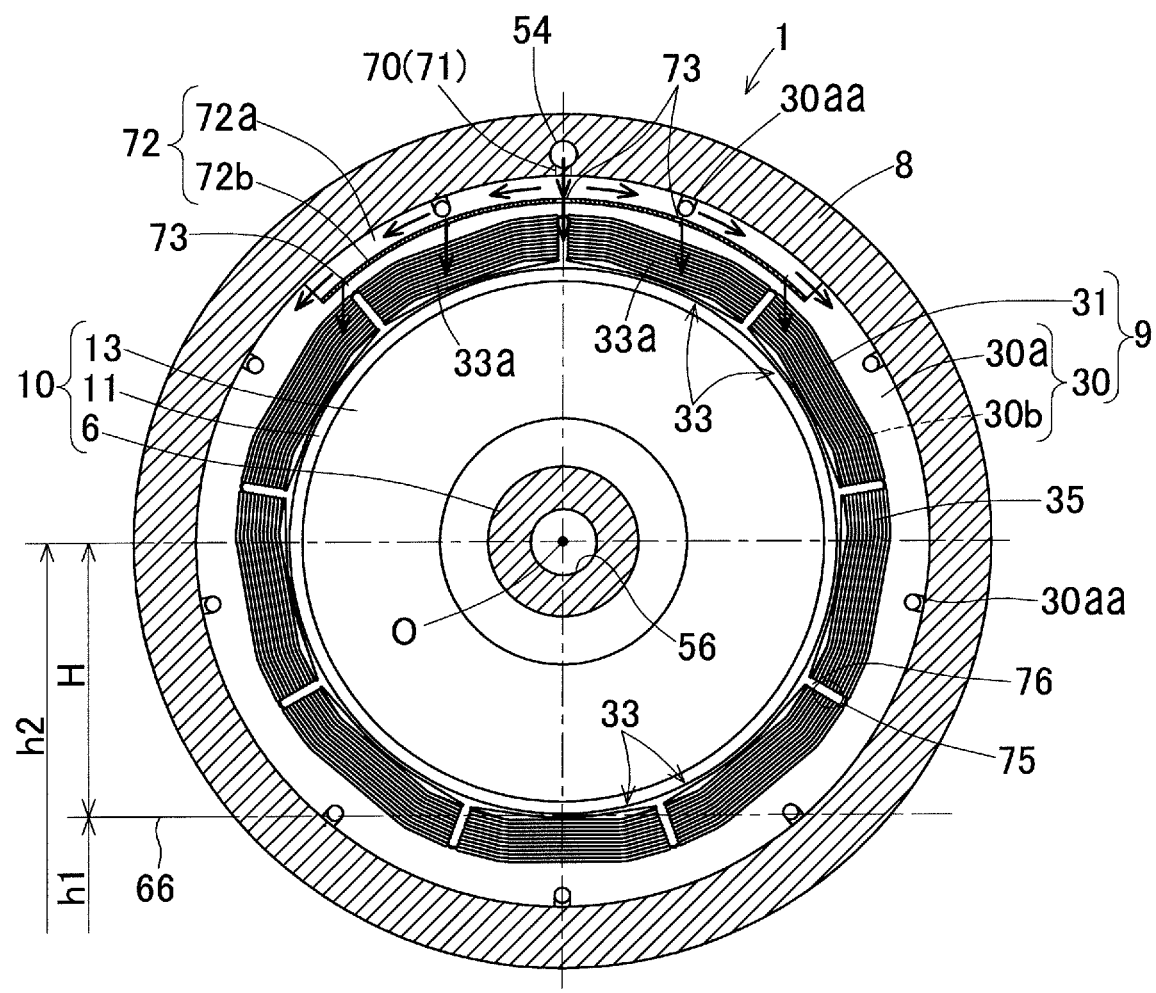
FIG. 2 is a cross-sectional view taken along a line II-II in FIG. 1.

The stator 9 includes a stator core 30, and a stator coil 31 to be wound around the stator core 30. The stator core 30 is made of a soft magnetic material, for example. As shown in FIG. 2 that is a cross-sectional view taken along a line II-II in FIG. 1, a plurality of teeth 30b are arranged on an inner diameter side of an annular portion 30a, radially around the axis O of the rotor 10. The stator coil 31 has a plurality of individual coils 33. Each individual coil 33 is obtained by winding a conductor wire 35 around the corresponding tooth 30b of the stator core 30.

The stator 9 is fixed such that the annular portion 30a is fitted to an inner peripheral surface of the motor housing 8, and fastened in the motor shaft direction by means of bolts (not shown). The bolts are inserted from the outboard side into fixing grooves 30aa formed at an outer peripheral portion of the annular portion 30a, and the ends of the bolts are screwed into internal screw threads (not shown) formed at a housing step portion 8a (refer to FIG. 1) of the motor housing 8.

As shown in FIG. 1, the rotor 10 is composed of: the rotor shaft 6; a rotor core 11; a magnet (not shown) disposed in an opening inside the rotor core 11; and a fixing member 13 that fixes the rotor core 11 to the rotor shaft 6. The fixing member 13 of this embodiment is formed integrally with the rotor shaft 6. Specifically, the fixing member 13 is composed of: a base portion 13a that is a connection portion with the rotor shaft 6; a cylindrical portion 13b that extends to the outboard side and the inboard side from an outer diameter end of the base portion 13a; and paired flange portions 13c, 13c extending from an outboard end and an inboard end of the cylindrical portion 13b toward the outer diameter side. The rotor core 11 is fixed between the paired flange portions 13c, 13c of the fixing member 13.

The rotor shaft 6 transmits a drive force of the electric motor 1 to the reducer 2. The rotor shaft 6 has a cylindrical shape, and an inboard portion of the reducer input shaft 3 is fitted to an outboard portion of the rotor shaft 6. The rotor shaft 6 and the reducer input shaft 3 are fitted to each other by spline-fitting (also including serration fitting; the same applies below). The reducer input shaft 3 is rotatably supported by the rolling bearings 14a, 14b, coaxially with the rotor shaft 6. The rolling bearing 14a is fitted in a cup of the output member 4, and the rolling bearing 14b is fitted in a cylindrical coupling member 4a. The cup of the output member 4 is coupled with the coupling member 4a via inner pins 22.

Eccentric segments 15, 16 are provided on an outer peripheral surface of the reducer input shaft 3. The eccentric segments 15, 16 are provided, 180° out of phase with each other, such that the respective centrifugal forces caused by eccentric motions of the eccentric segments 15, 16 are canceled with each other. The reducer 2 is a mechanical reducer. For example, the reducer 2 is a cycloid reducer including curvilinear plates 17, 18, a plurality of outer pins 19, and a counterweight 21.

Figure 3:
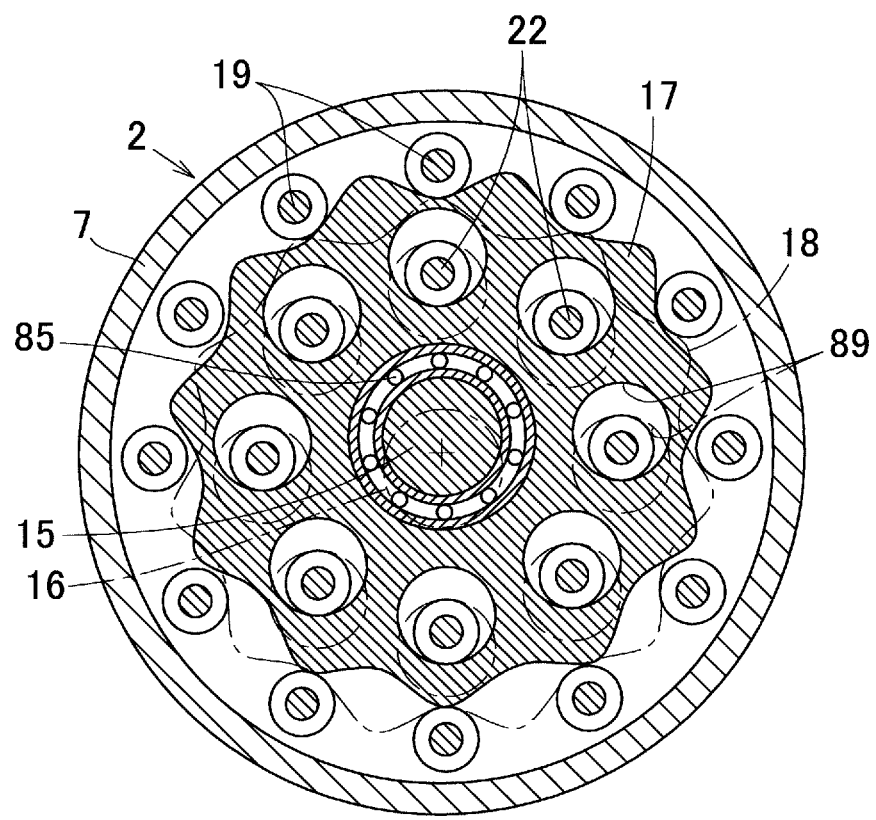
FIG. 3 is a cross-sectional view taken along a line III-III in FIG. 1.

FIG. 3 is a cross-sectional view of the reducer, taken along a line III-III in FIG. 1. In the reducer 2, the two curvilinear plates 17, 18 each having an outer shape formed in a gentle wavy trochoid curve are mounted to the eccentric segments 15, 16, respectively, via a rolling bearing 85. The plurality of outer pins 19 that guide, on the outer periphery side thereof, eccentric motions of the curvilinear plates 17, 18 are provided inside the reducer housing 7. The plurality of inner pins 22 are inserted in and engaged with a plurality of circular through-holes 89 that are formed in the respective curvilinear plates 17, 18.

Figure 4:
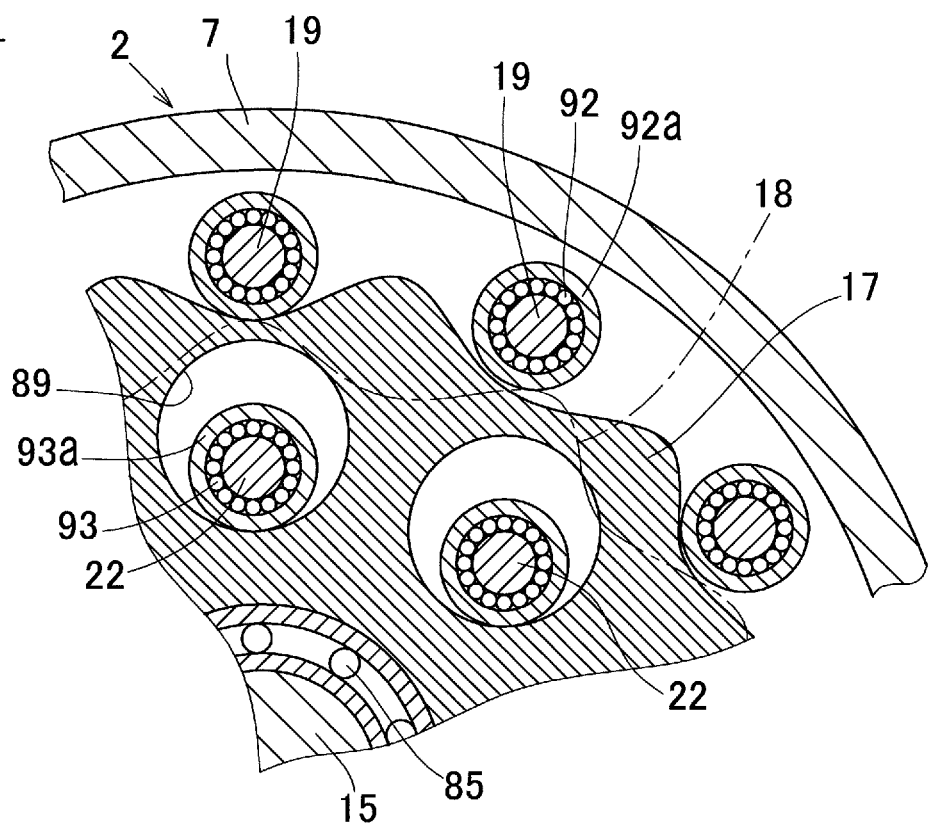
FIG. 4 is a partially enlarged view of FIG. 3.

As shown in the enlarged view in FIG. 4, each outer pin 19 has a needle roller bearing 92 fitted thereto, and each inner pin 22 has a needle roller bearing 93 fitted thereto.

Each outer pin 19 is supported by the needle roller bearing 92 at opposite ends thereof. An outer ring 92a of each needle roller bearing 92 is fixed to the reducer housing 7, and the outer pin 19 is rotatably supported and is in rolling contact with the outer peripheral surfaces of the curvilinear plates 17, 18, whereby the contact friction between each outer pin 19 and the outer peripheries of the curvilinear plates 17, 18 is reduced. In addition, with respect to each inner pin 22, an outer ring 93a of each needle roller bearing 93 reduces the contact friction between the inner pin 22 and the inner periphery of the through-hole 89 of each of the curvilinear plates 17, 18.

Thus, as shown in FIG. 1, the eccentric motions of the curvilinear plates 17, 18 can be smoothly transmitted as a rotary motion to an inner member (rotating ring) 5a of the wheel bearing 5. When the rotor shaft 6 rotates, the curvilinear plates 17, 18 provided at the reducer input shaft 3 that rotates together with the rotor shaft 6 perform the respective eccentric motions. At this time, each outer pin 19 engages, in rolling contact, with the outer peripheral surfaces of the curvilinear plates 17, 18 performing the eccentric motions. In addition, with respect to the curvilinear plates 17, 18, due to the engagement between each inner pin 22 and the corresponding through-hole 89 (FIG. 3), only the rotational motions of the curvilinear plates 17, 18 are transmitted as the rotary motion to the output member 4 and the inner member 5a of the wheel bearing 5. As a result, the speed of rotation of the inner member 5a is reduced relative to the speed of rotation of the rotor shaft 6.

The wheel bearing 5 is a double-row angular contact ball bearing obtained by inserting balls between the inner member 5a and an outer member 5b. The outer member 5b is bolt-fixed to the reducer housing 7 at a flange 5c. The inner member 5a is spline-fitted to the output member 4. The rotational motion transmitted to the inner member 5a is transmitted to a tire from a wheel mounting flange 5d provided at the outboard-side outer peripheral surface of the inner member 5a.

Next, the oil supply mechanism K will be described with reference to FIG. 1. The oil supply mechanism K contributes to cooling of the electric motor 1 and the reducer 2, and to lubrication of the rolling bearings 12A, 12B, 14a, and 14b that support the reducer 2 and the rotor shaft 6. The oil supply mechanism K is composed of: a pump 50 provided at the boundary between the reducer housing 7 and the motor housing 8; an oil reservoir 51 provided at a bottom portion of the reducer housing 7; and oil passages 52 to 60 provided in the electric motor 1 and the reducer 2.

The pump 50 is a cycloid pump, for example. The pump 50 sucks the lubricating oil stored in the oil reservoir 51 through a suction oil passage 52, and sends the lubricating oil to a feeding oil passage 53. The feeding oil passage 53 is provided in the motor housing 8, and extends upward. An upper end of the feeding oil passage 53 communicates with the outboard end of an axial oil passage 54. The axial oil passage 54 extends inside an upper portion of the motor housing 8, along the axial direction. In the axial oil passage 54, two oil holes 70, 71, which serve as a lubricating oil supply portion (described later), are provided so as to communicate with the inside of the motor housing 8.

An inboard end of the axial oil passage 54 communicates with an upper end of a connection oil passage 55 provided in a motor cover 8a of the motor housing 8. A lower end of the connection oil passage 55 extends to the position of the axis O of the rotor 10, and communicates with a rotor-axis oil passage 56. The rotor-axis oil passage 56 extends from the inboard side to the outboard side along the axis O of the rotor 10. The lower end of the connection oil passage 55 communicates with the inboard side of the rotor-axis oil passage 56.

The rotor-axis oil passage 56 communicates with a reducer-axis oil passage 57 in the reducer input shaft 3, at an outboard end thereof, and communicates with a discharge oil passage 60, at an axially middle portion thereof.

The reducer-axis oil passage 57 is provided in the reducer input shaft 3 along the axis of the reducer 3, and extends from the inboard side to the to outboard side. From an axial position, in the reducer-axis oil passage 57, at which the eccentric segments 15, 16 are provided, a reducer supply oil passage 58 extends to the inside of the reducer housing 7. The inside of the reducer housing 7 is communicated with the oil reservoir 51 via an exhaust oil passage 59.

The discharge oil passage 60 is composed of a radial hole 61, a gap portion 62, an oil groove (no shown), and an oil discharge hole (not shown). The radial hole 61 is provided in the radial direction of the motor 1, across the rotor shaft 6 and the base portion 13a of the fixing member 13. An inner diameter end of the radial hole 61 communicates with the rotor-axis oil passage 56, while an outer diameter end thereof is opened at the gap portion 62. The gap portion 62 is a space formed between the cylindrical portion 13b of the fixing member 13 and the inner peripheral surface of the rotor core 11. The oil groove is provided along an inner surface, of the flange portion 13c of the fixing member 13, which is in contact with an end surface of the rotor core 11. An inner diameter end of the oil groove in the motor radial direction communicates with the gap portion 62. The oil discharge hole obliquely extends from an outer diameter end of the oil groove in the motor radial direction, outward in the motor shaft direction and toward the outer diameter side in the motor radial direction. An end of the oil discharge hole is opened in the space inside the motor housing 8.

The oil holes 70, 71 serving as the lubricating oil supply portion are provided in the axial oil passage 54, and are located above an outboard coil end 33a and an inboard coil end 33a, respectively, of upper individual coils 33 (in the illustrated example, the individual coil 33 at uppermost portion). A guide plate 72 is provided between each of the oil holes 70, 71, and outer-diameter-side end surfaces of the upper individual coils 33. The guide plate 72 distributes, in the circumferential direction, the lubricating oil discharged from the corresponding oil hole 70, 71 to supply the lubricating oil onto the coil ends 33a of the upper individual coils 33.

Figure 5:
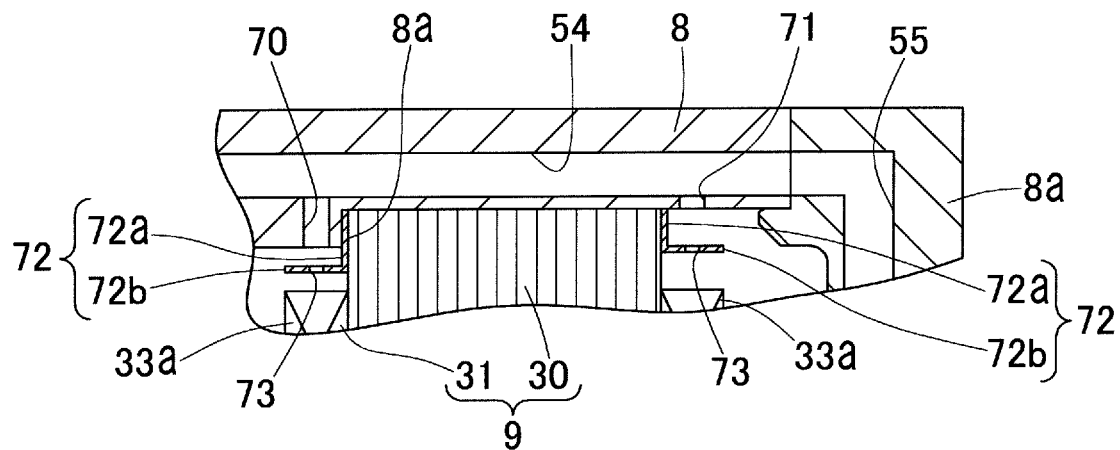
FIG. 5 is an enlarged view of an area V in FIG. 1.

Specifically, as shown in FIG. 2, each guide plate 72 is a plate member having an arc shape along the inner circumference of the upper portion of the motor housing 8. As shown in FIG. 5 which is an enlarged view of an area V in FIG. 1, each guide plate 72 has an L-shaped section having a riser portion 72a and an arc portion 72b. The arc portion 72b has a plurality of (five in the example of FIG. 2) communication holes 73 provided at appropriate intervals in the circumferential direction. Each of the outboard guide plate 72 and the inboard guide plate 72 is fixed, at the riser portion 72a, to the housing step portion 8a by means of a plurality of bolts (not shown) together with the stator core 30.

In FIG. 1, an oil drain groove 65 is provided at the bottom portion of the motor housing 8, which is a lower end of the space inside the motor housing 8. The oil drain groove 65 communicates with the oil reservoir 51. The height of an oil level 66 (oil level height h1, refer to FIG. 2) of the lubricating oil accumulated in the bottom portion of the motor housing 8 is set so that the lower end of the rotor 10 is not immersed in the lubricating oil. Thus, it is possible to eliminate the possibility of heat generation due to a drag resistance that may be caused when the rotor 10 rotating at a high speed scoops up and stirs the lubricating oil. However, since the difference between the height of the lower end of the rotor 10 and the height of the oil level 66 when the motor 1 is stationary is small, the lower portion of the rotor 10 may come into contact with the lubricating oil if the oil level 66 of the lubricating oil varies when the vehicle turns or is abruptly accelerated or decelerated.

As shown in FIG. 2, a temperature detector 75 for detecting the temperature of the stator coil 31 is provided in the motor housing 8. The temperature detector 75 is connected to a control device (not shown). A thermistor, a thermocouple, or the like is used as the temperature detector 75. A thermistor is preferable in terms of cost.

The temperature detector 75 is desired to be covered with an insulating member (not shown). For example, resin is used as the insulating member. When the temperature detector 75 is covered with the insulating member, even if the lubricating oil is splashed onto the temperature detector 75, the temperature detector 75 is hardly affected. In addition, resin has excellent coverability, and is easy to process.

The temperature detector 75 is provided at a position that satisfies the following conditions.

Condition 1: the position is lower than an axial height h2 (FIG. 2) of the rotor 10.

Condition 2: the position is higher than the oil level height h1 of the lubricating oil accumulated in the bottom portion of the motor housing 8.

Condition 3: the position is within the range of the gap 76 between individual coils 33 adjacent in the circumferential direction, except a portion between the coil ends 33a of the adjacent individual coils 33.

Condition 4: the position is on the side opposite to the side where the lower end of the rotor 10 moves due to rotation of the rotor 10 when the vehicle travels forward, with respect to the axis O of the rotor 10. In FIG. 2, assuming that the rotation direction of the rotor 10 when the vehicle travels forward is the clockwise direction, the temperature detector 75 is disposed to the right of the axis O of the rotor 10.

It is essential to satisfy the conditions 1 and 2, and it is preferable to further satisfy the condition 3. An appropriate height range defined by the conditions 1 and 2 is represented by H in FIG. 2. It is more preferable to further satisfy the condition 4.

Next, the flow of the lubricating oil when the electric motor 1 is driven will be described. As shown by arrows in FIG. 1, the lubricating oil sent out from the pump 50 passes through the feeding oil passage 53, the axial oil passage 54, and the connection oil passage 55 thereby to flow into the rotor-axis oil passage 56. While the lubricating oil flows as described above, part of the lubricating oil is supplied into the motor housing 8 through the oil holes 70, 71. The lubricating oil passing through the oil holes 70, 71 may be supplied as a continuous flow, or may be supplied as intermittent drops. Alternatively, the lubricating oil may be jetted out through the oil holes 70, 71. Part of the lubricating oil that has flowed into the rotor-axis oil passage 56 flows into the reducer-axis oil passage 57, and the rest of the lubricating oil flows into the discharge oil passage 60.

The lubricating oil that has flowed into the reducer-axis oil passage 57 is supplied into the reducer housing 7 through the reducer supply oil passage 58, due to the pressure of the pump 50 and the centrifugal force accompanying the rotation of the reducer input shaft 3. The components in the reducer 2 are lubricated and cooled by the lubricating oil.

The lubricating oil that has been used for the lubrication and cooling moves downward due to gravity, and is returned to the oil reservoir 51 through the exhaust oil passage 59.

The lubricating oil that has flowed into the discharge oil passage 60 passes through the radial hole 61, the gap portion 62, the oil groove, and the oil discharge hole in order, to be discharged into the motor housing 8. When the lubricating oil passes through the gap portion 62 and the oil groove that are in contact with the rotor core 11, the rotor core 11 is cooled. The lubricating oil discharged from the oil discharge hole is diffused to the outer diameter side due to the pressure at the discharge and the centrifugal force accompanying the rotation of the rotor 10, and cools the stator coil 31.

The lubricating oil that has been supplied into the motor housing 8 through the oil holes 70, 71 is, as indicated by arrows in FIG. 2, distributed in the circumferential direction by the guide plate 72, and supplied onto the coil ends 33a of the upper individual coils 33 through the communication holes 73 or the opposite ends of the guide plate 72 in the circumferential direction. Thus, since the guide plate 72 distributes the lubricating oil in the circumferential direction, the lubricating oil is uniformly spread not only over the coil ends 33a disposed directly below the oil holes 70, 71, but also over the coil ends 33a of the respective upper individual coils 33. Thus, by the lubricating oil supplied through the oil holes 70, 71, the individual coils 33 can be cooled also from the upper end surfaces of the coil ends 33a, to which the lubricating oil has been difficult to be applied in the conventional technique.

The lubricating oil that has been discharged from the oil discharge hole of the discharge oil passage 60 and used for cooling the electric motor 1, and the lubricating oil that has been supplied through the oil holes 70, 71 and used for cooling the electric motor 1, move downward due to gravity to be collected in the oil drain groove 65 at the bottom portion of the motor housing 8. While the lubricating oil is moving downward, the lubricating oil lubricates and cools the rolling bearings 12A, 12B. The lubricating oil collected in the oil drain groove 65 is returned to the oil reservoir 51.

As described above, since the coil ends 33a of the individual coils 33 are cooled with the lubricating oil from both the inner diameter side and the outer diameter side in the motor radial direction, the entirety of the electric motor 1 can be uniformly cooled. When the electric motor 1 is rotating at a low speed, since the centrifugal force caused by the rotation of the rotor 10 is small, the lubricating oil discharged from the discharge oil passage 60 may not sufficiently reach the upper individual coils 33. Even in such a case, the upper individual coils 33 can be reliably and efficiently cooled by the lubricating oil supplied through the oil holes 70, 71. Thus, the output of the electric motor 1 can be improved without increasing the size of the electric motor 1.

While the electric motor 1 is rotating, the temperature of the stator coil 31 is detected by the temperature detector 75 (FIG. 2). As described above, the result of the detection by the temperature detector 75 is transmitted to the control device. Based on the detected temperature of the stator coil 31, the control device controls energization of the stator coil 31. For example, when the temperature of the stator coil 31 has become equal to or higher than a predetermined temperature, it is determined that Joule's heat may be generated in the stator coil 31 and thereby the insulating coating of the coil conductor may be melted, and the amount of energization is reduced or the energization is interrupted.

The temperature detector 75 is disposed at the aforementioned position, i.e., the position within the height range H between the axial height h2 of the rotor 10 and the oil level height h1 and within the gap 76 between the individual coils 33 adjacent in the circumferential direction, except a portion between the coil ends 33a of the adjacent individual coils 33. Thus, the substantially highest temperature of the stator coil 31 can be accurately detected. The reason is described below.

When the lubricating oil is supplied into the motor housing 8 through the oil holes 70, 71 serving as the lubricating oil supply portion, the lubricating oil is first supplied onto the coil ends 33a of the upper individual coils 33, and thereafter, sequentially flows from the upper individual coils 33 toward the lower individual coils 33 along the coil ends 33a of the respective individual coils 33. Meanwhile, the lubricating oil cools the respective individual coils 33. The upper individual coils 33, which are cooled by the lubricating oil that has just been supplied through the oil holes 70, 71 and does not have heat, are low in temperature, whereas the lower individual coils 33, which are cooled by the lubricating oil whose temperature has increased, are high in temperature. Therefore, the temperature detector 75 disposed at a position lower than the axis O of the rotor 10 can detect the temperature of the high-temperature individual coils 33.

The stator coil 31, which is immersed in the lubricating oil accumulated in the bottom portion of the motor housing 8, has a temperature that follows the temperature of the lubricating oil. Therefore, if the temperature of an individual coil 33 being immersed in the lubricating oil, among the plurality of the individual coils 33, is regarded as the highest temperature, an accurate highest temperature cannot be obtained. Thus, the temperature detector 75, which is disposed at a position higher than the oil level 66 of the lubricating oil, can accurately detect the highest temperature of the stator coil 31.

Since the lubricating oil flows along the coil ends 33a of the respective individual coils 33, if the temperature detector 75 is disposed between the coil ends 33a, the temperature detector 75 is likely to be affected by the lubricating oil. In the configuration of the present embodiment, the temperature detector 75 is disposed within the range of the gap 76 between the individual coils 33 adjacent in the circumferential direction, except a portion of the gap 76 between the coil ends 33a of the adjacent individual coils 33, whereby the temperature detector 75 is hardly affected by the lubricating oil, and the highest temperature of the stator coil 31 can be accurately detected.

In addition, the temperature detector 75 is disposed at a position on the side opposite to the side where the lower end of the rotor 10 moves due to rotation of the rotor 10 when the vehicle travels forward, with respect to the axis O of the rotor 10. Therefore, the following operation and effect are achieved.

In the configuration of this example, since the difference between the height of the oil level 66 and the height of the lower end of the rotor 10 is small under remaining stationary, if the oil level varies due to turning or abrupt acceleration/deceleration of the vehicle, the rotor 10 may scoop up the lubricating oil. The scooped-up lubricating oil is spattered in the direction in which the lower end of the rotor 10 moves due to rotation of the rotor 10. For example, in FIG. 2, assuming that the rotation direction of the rotor 10 is the clockwise direction, the lubricating oil is scooped up from the lower end of the rotor 10 to the left (toward a region from 6 o'clock to 9 o'clock when considered as a clock).

When the temperature detector 75 is disposed at a position on the side opposite to the side where the lower end of the rotor 10 moves, with respect to the axis O of the rotor 10, the scooped-up lubricating oil is not applied to the temperature detector 75. Since forward traveling of the vehicle is significantly higher in frequency than backward traveling thereof, if the temperature detector 75 is disposed at a position on the side opposite to the side where the lower end of the rotor 10 moves when the vehicle travels forward, with respect to the axis O of the rotor 10, most of the scooped-up lubricating oil is prevented from being applied to the temperature detector 75. Meanwhile, since the rotation speed of the rotor 10 when the vehicle travels backward is low, the amount of the lubricating oil to be scooped up by the rotor 10 when the vehicle moves backward is small. Therefore, the temperature detector 75 is hardly affected by the lubricating oil being scooped up by the rotor 10 when the vehicle moves backward.

Figure 6:
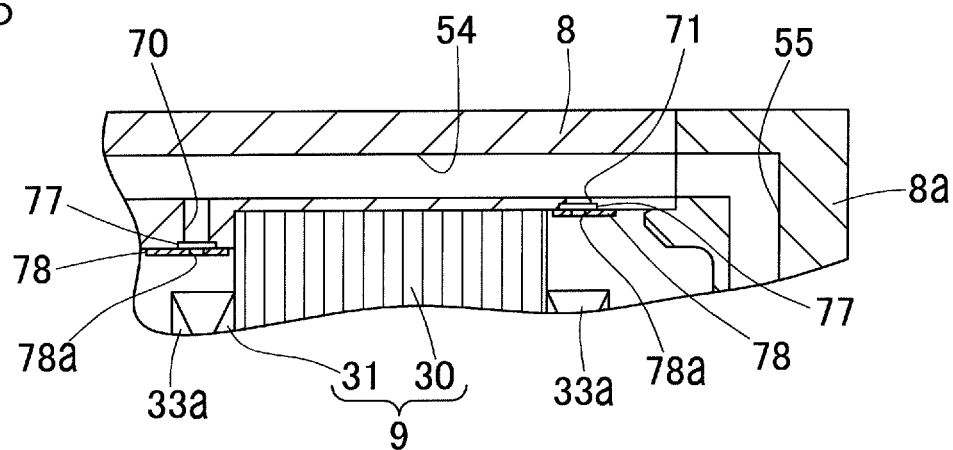
FIG. 6 is a longitudinal sectional view of a major part of the vehicle drive device of the present invention, having a guide plate of a different form.
Figure 7:
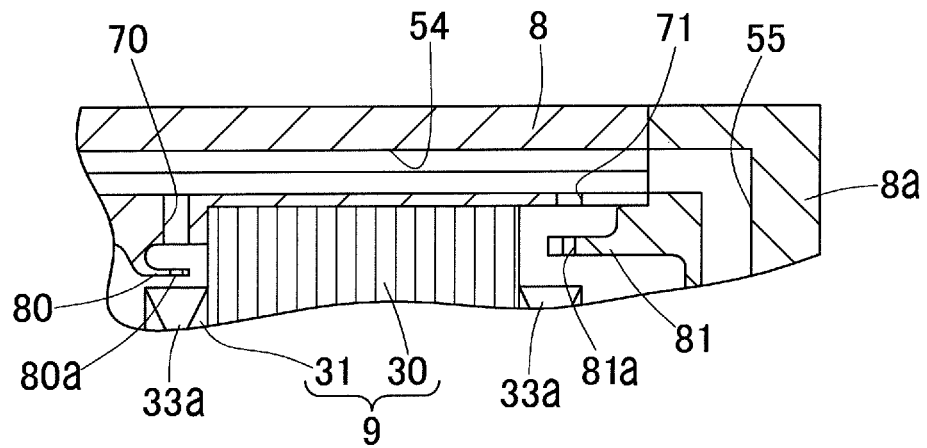
FIG. 7 is a longitudinal sectional view of a major part of the vehicle drive device of the present invention, having a guide plate of another different form.

FIG. 6 and FIG. 7 show other examples of guide plates for distributing the lubricating oil supplied through the oil holes 70, 71 in the circumferential direction. In the configuration shown in FIG. 6, grooves 77 to be arc-shaped communicating with the respective oil holes 70, 71 are formed at the inner circumferential surface of the motor housing 8, and guide plates 78 to be arc-shaped are provided so as to close the grooves 77. Each arc-shaped groove 77 is formed at an axial position where the oil hole 70, 71 is present so as to have a vertex corresponding to the position of the oil hole 70, 71. Each guide plate 78 is fixed to the inner circumferential surface of the motor housing 8. Each guide plate 78 has a plurality of communication holes 78a provided at appropriate intervals in the circumferential direction.

According to this configuration, the lubricating oil, which has temporarily been dropped from each oil hole 70, 71 onto the outer peripheral surface of the guide plate 78, is dispersed in the circumferential direction along the arc-shaped groove 77, and then is supplied onto the coil ends 33a through the plurality of communication holes 78a of the guide plate 78, respectively. Thus, the lubricating oil can be uniformly spread not only over the coil ends 33a disposed directly below the oil holes 70, 71, but also over the coil ends 33a of the respective upper individual coils 33. Furthermore, in this case, the space inside the motor housing 8 can be ensured to be wider than that in the configuration shown in FIG. 5, thereby increasing the degree of freedom in design.

In the configuration shown in FIG. 7, guide plates 80, 81 are integrally formed in the motor housing 8. The guide plates 80, 81 are formed to extend by a predetermined distance in the motor shaft direction from near the oil holes 70, 71 in the motor housing 8, and to be slightly away from the oil holes 70, 71 in the radially inward direction. The guide plates 80, 81 each have an arc shape as viewed in the motor shaft direction, and have a plurality of communication holes 80a, 81a, respectively, provided at appropriate intervals in the circumferential direction.

According to this configuration, the lubricating oil, which has temporarily been dropped from the oil holes 70, 71 onto the outer peripheral surfaces of the guide plates 80, 81, is dispersed in the circumferential direction along the outer peripheral surfaces of the guide plates 80, 81, and then is supplied onto the coil ends 33a from the plurality of communication holes 80a, 81a of the guide plates 80, 81, respectively. Thus, as in the configurations shown in FIG. 5 and FIG. 6, the lubricating oil can be uniformly spread not only over the coil ends 33a disposed directly below the oil holes 70, 71, but also over the coil ends 33a of the respective upper individual coils 33. Further, in this case, the number of components can be reduced and thereby the assembly of the device can be simplified, as compared with the configurations shown in FIG. 5 and FIG. 6.

Hereinafter, another embodiment of the present invention will be described. In a vehicle drive device shown in FIG. 8 to FIG. 14, each of individual coils 33 (FIG. 9) of a stator coil 31 is configured by winding a conductor wire 35 around a corresponding tooth 30b of a stator core 30 via an insulating bobbin 34. This embodiment is identical to the embodiment shown in FIG. 1 to FIG. 5 except the configuration of the stator coil 31. The same components as those in the aforementioned embodiment are designated by the same reference numerals, and the description thereof is omitted.

Figure 8:
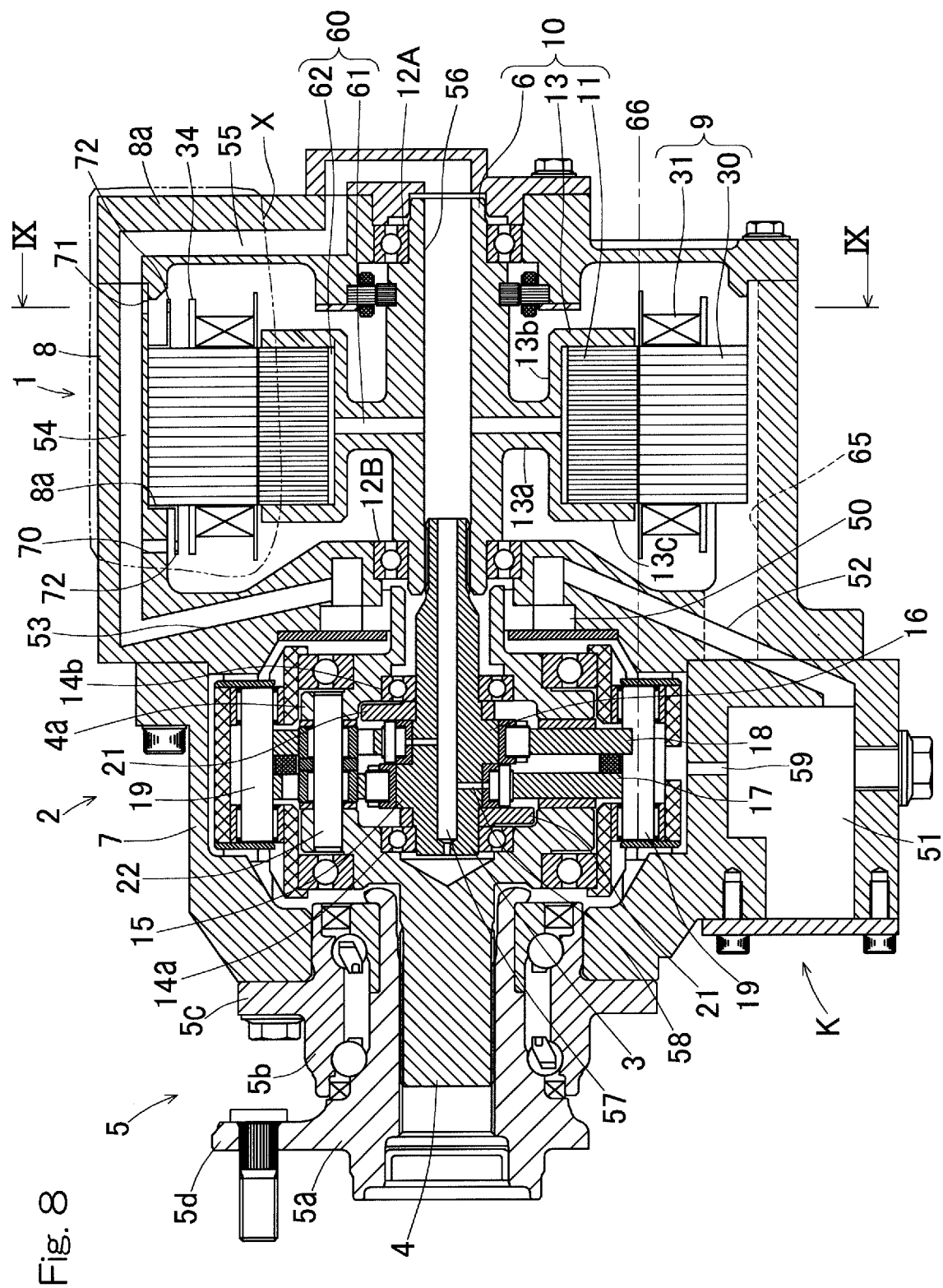
FIG. 8 is a longitudinal sectional view of a vehicle drive device according to another embodiment of the present invention.
Figure 10:
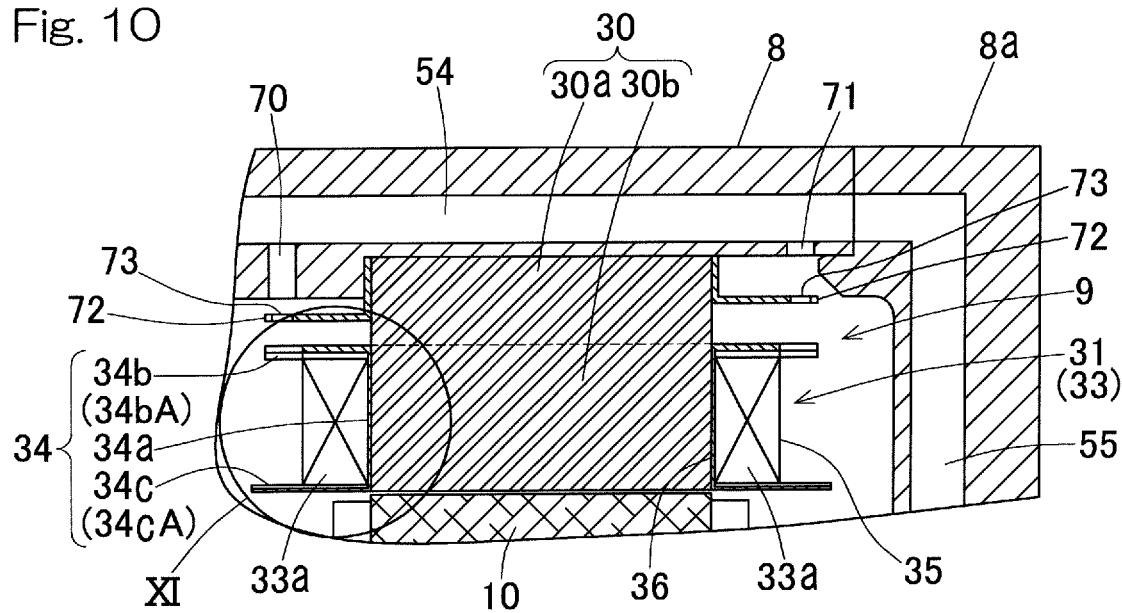
FIG. 10 is an enlarge view of an area X in FIG. 8.

FIG. 10 is an enlarged view of an area X surrounded by a double dotted line shown in FIG. 8. The insulating bobbin 34 includes: a conductor-wire winding part 34a to be cylindrical having a through-hole 36 in which the tooth 30b of the stator core 30 is inserted; and an outer-diameter-side flange 34b and an inner-diameter-side flange 34c that protrude along a stacking direction (refer to FIG. 14) of the conductor wire 35 from an outer diameter end and an inner diameter end, of the conductor-wire winding part 34a, in the motor radial direction, respectively.

In FIG. 10, a coil-end upper portion 34bA extending in the motor shaft direction from the conductor-wire winding part 34a is shown as the outer-diameter-side flange 34b. Likewise, a coil-end lower portion 34cA extending in the motor shaft direction from the conductor-wire winding part 34a is shown as the inner-diameter-side flange 34c. The coil-end upper portion 34bA as the outer-diameter-side flange 34b and the coil-end lower portion 34cA as the inner-diameter-side flange 34c protrude toward the motor shaft direction over the stacking range of the conductor wire 35, at both the outboard side and the inboard side.

Figure 11:
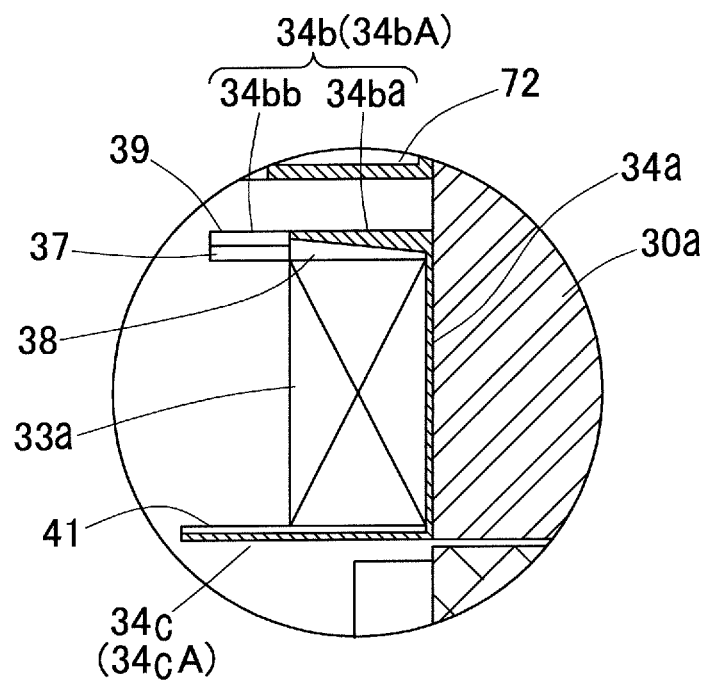
FIG. 11 is an enlarged view of an area XI in FIG. 10.

As shown in FIG. 11 which is an enlarged view of an area XI shown in FIG. 10, the coil-end upper portion 34bA as the outer-diameter-side flange 34b includes: a conductor-wire stacking portion 34ba corresponding to a range in which the conductor wire 35 is stacked; and a protruding portion 34bb that protrudes toward the motor shaft direction from the conductor-wire stacking portion 34ba. The aforementioned two oil holes 70, 71 (FIG. 10) are located directly above the protruding portion 34bb at the outboard side and inboard side, respectively, of the outer-diameter-side flange 34b of the insulating bobbin 34.

Each protruding portion 34bb has oil introducing cutouts 37 that are opened at the outer diameter side in the motor radial direction. The oil introducing cutouts 37 of this embodiment each have a slit shape communicating from the outer diameter side to the inner diameter side in the motor radial direction. At a lower surface (inner-diameter-side surface) of the conductor-wire stacking portion 34ba, outer-diameter-side oil guide grooves 38 communicating with the oil introducing cutouts 37 are formed. The outer-diameter-side oil guide grooves 38 of this embodiment each have a shape such that the depth thereof, in the motor radial direction, gradually increases toward the oil introducing cutout 37.

Figure 9:
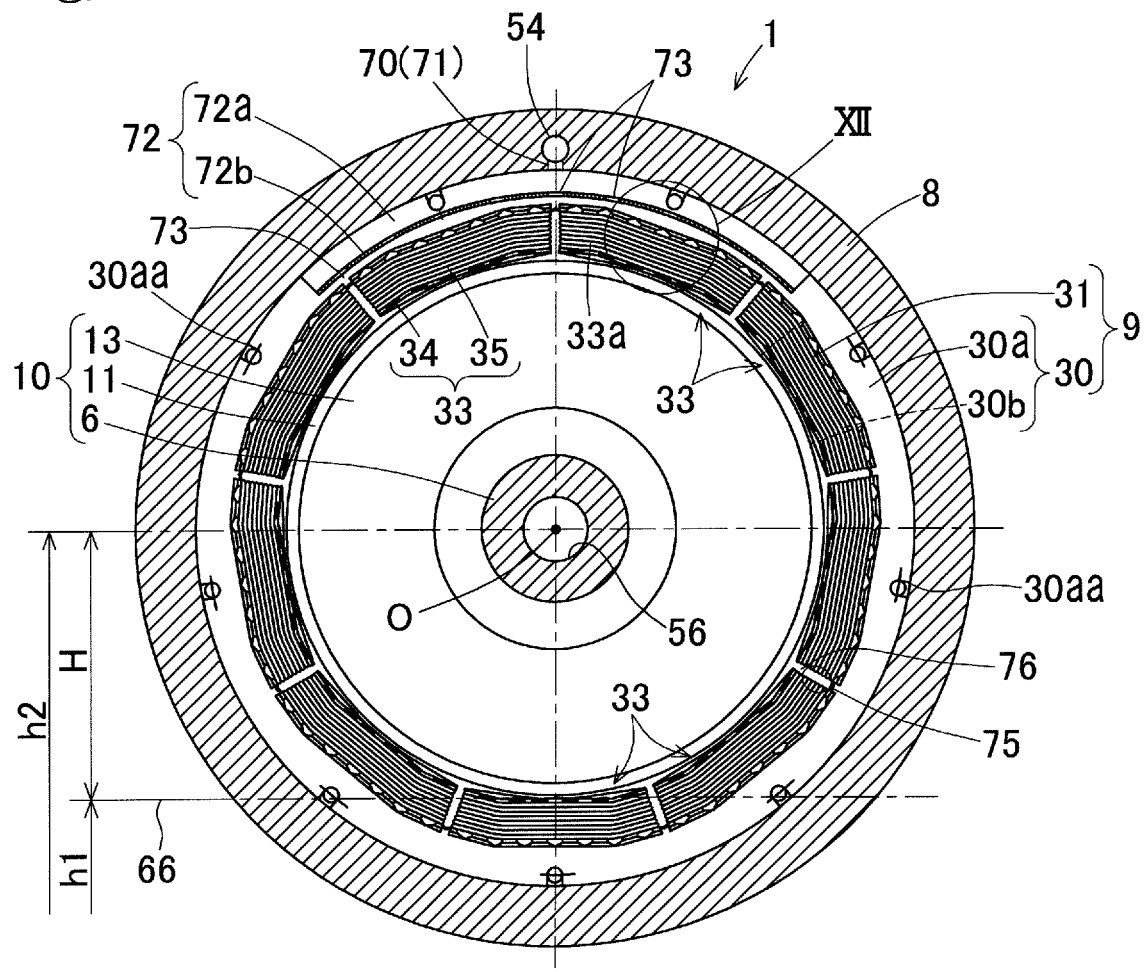
FIG. 9 is a cross-sectional view taken along a line IX-IX in FIG. 8.
Figure 12:
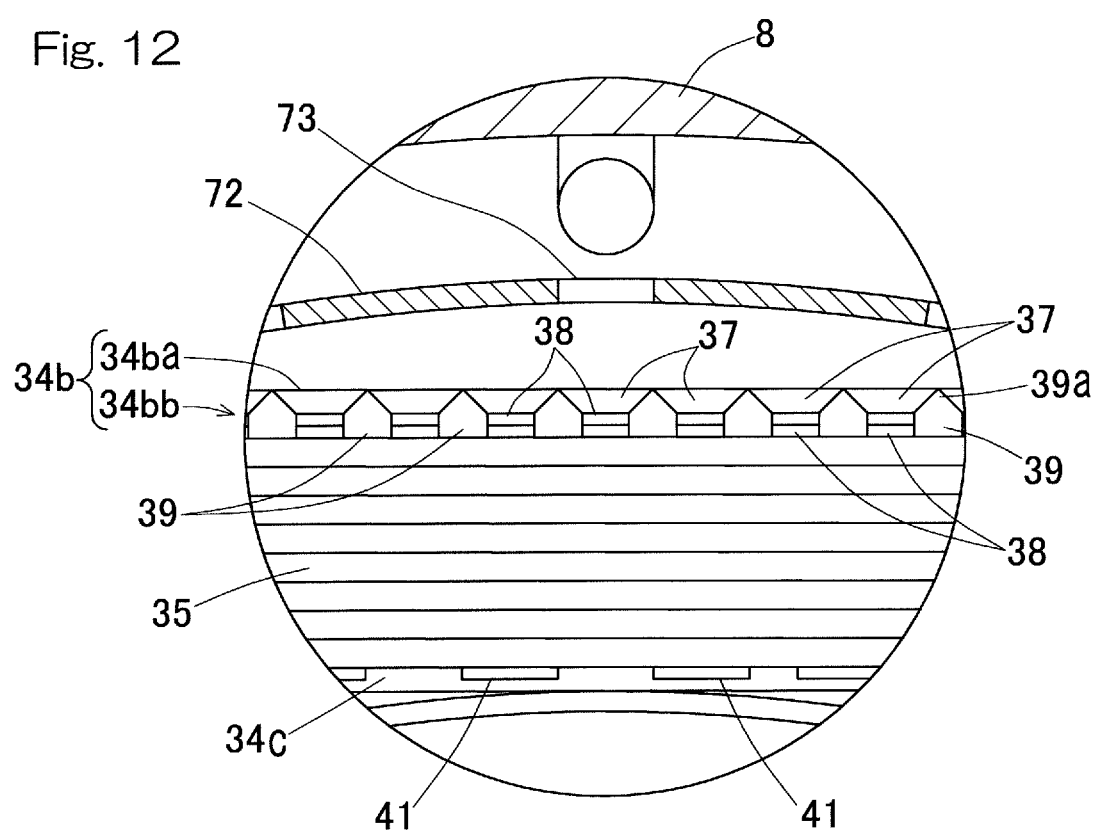
FIG. 12 is an enlarged view of an area XII in FIG. 9.
Figure 13:
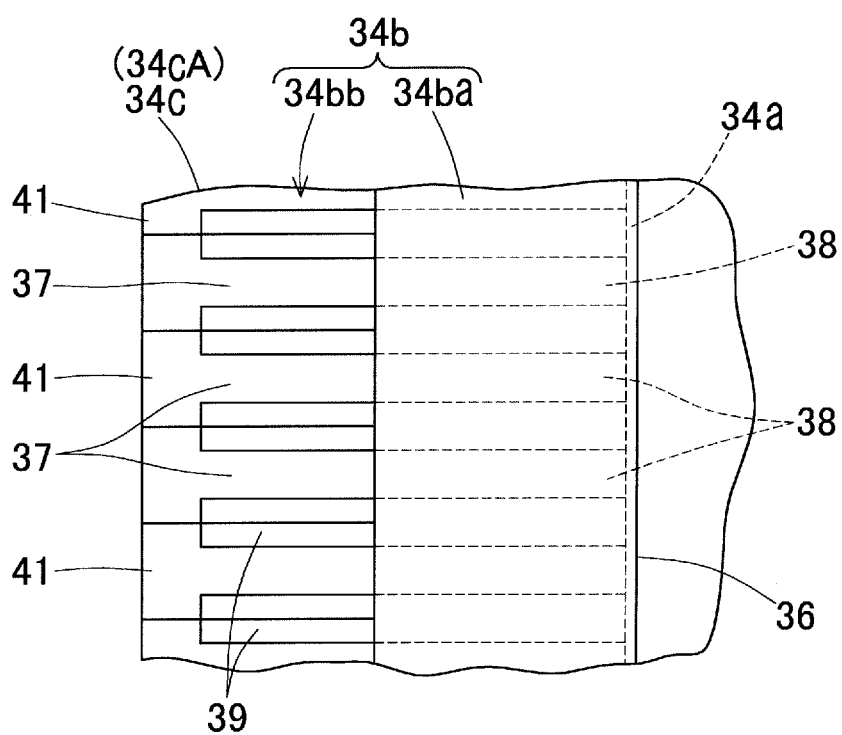
FIG. 13 is a plan view of a part of an individual coil of a stator in an electric motor of the vehicle drive device.
Figure 14:
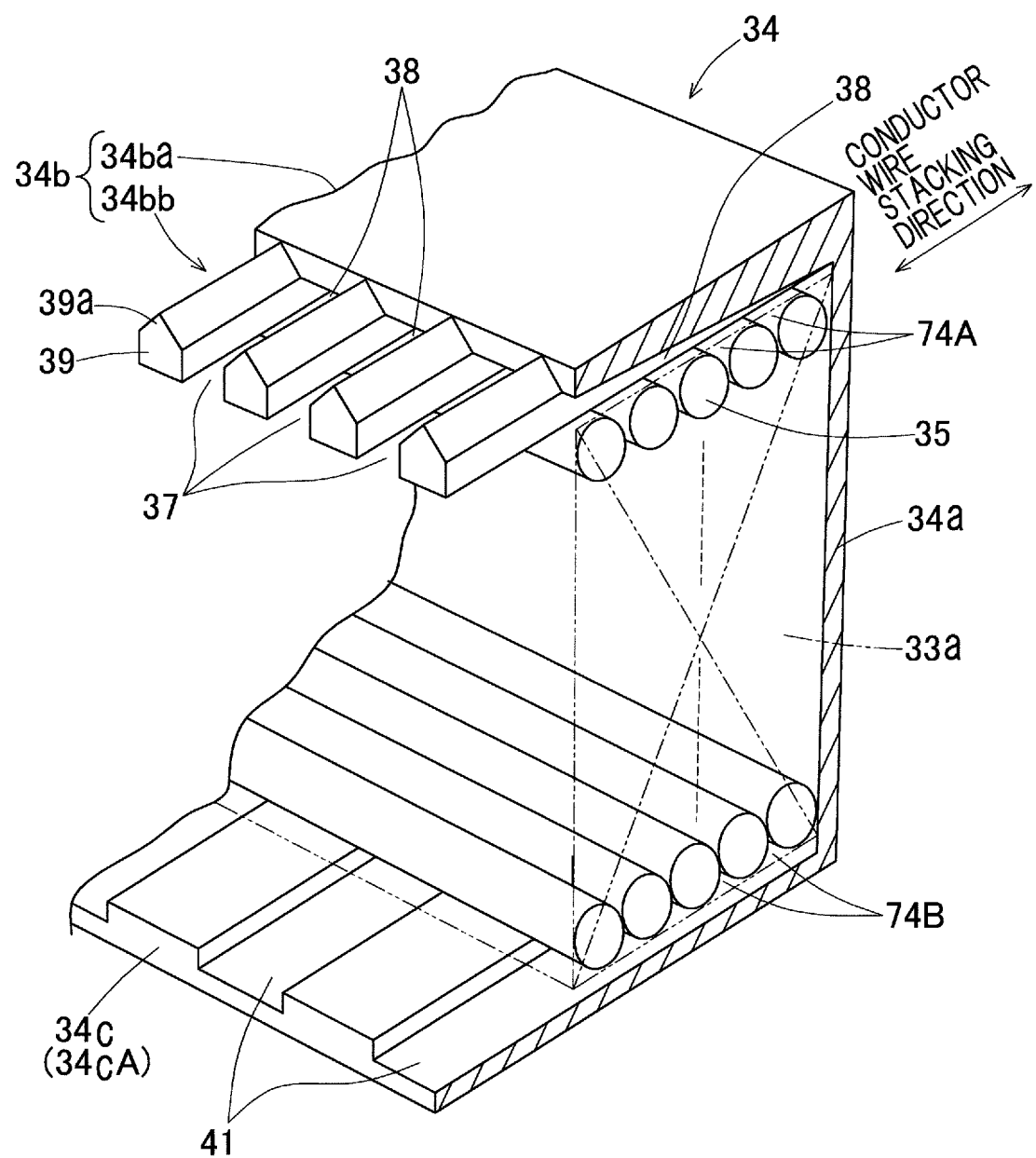
FIG. 14 is a perspective view of a part of the individual coil.

FIG. 12 is an enlarged view of an area XII shown in FIG. 9, FIG. 13 is a plan view of a portion of an individual coil, and FIG. 14 is a perspective view of a portion of an individual coil. As shown in these figures, the protruding portion 34bb of the outer-diameter-side flange 34b is composed of a plurality of pillar portions 39 extending in the motor shaft direction from the conductor-wire stacking portion 34ba. Portions between the respective pillar portions 39 are the oil introducing cutouts 37. Each pillar portion 39 has a projection-shaped section (e.g., a crest-shaped section) in which the width, in the circumferential direction, of an outer-diameter-side portion 39a thereof in the motor radial direction gradually decreases radially outward.

As shown in FIG. 11, FIG. 13, and FIG. 14, the inner-diameter-side flange 34c protrudes in the motor shaft direction more than the outer-diameter-side flange 34b. At an outer diameter surface of the coil-end lower portion 34cA of the inner-diameter-side flange 34c, a plurality of inner-diameter-side oil guide grooves 41 extending in the motor shaft direction are formed. The inner-diameter-side oil guide grooves 41 are formed from a proximal end to a distal end, in the motor shaft direction, of the outer diameter surface of the coil-end lower portion 34cA of the inner-diameter-side flange 34c.

According to this configuration, the lubricating oil supplied into the to motor housing 8 through the oil holes 70, 71 serving as the lubricating oil supply portion cools the stator coil 31 through a route as follows.

In FIG. 10, the lubricating oil that has been supplied into the motor housing 8 is temporarily received by the guide plate 72. Then, the lubricating oil drops downward directly from the respective communication holes 73 of the guide plate 72, or, after reaching through the communication holes 73, drops downward so as to be dispersed from the respective portions below the guide plate 72. The lubricating oil that has dropped from the guide plate 72 is introduced into the oil introducing cutouts 37 of the insulating bobbins 34 of the upper individual coils 33. As shown in FIG. 12 and FIG. 14, since the outer-diameter-side portions 39a of the pillar portions 39, which are portions between the respective oil introducing cutouts 37, each have a projecting shape such as a crest shape, the lubricating oil that has hit the pillar portions 39 hardly rebounds, and therefore, the lubricating oil is easily guided downward along the outer-diameter-side portions 39a of the pillar portions 39. Thus, the lubricating oil is smoothly introduced into the oil introducing cutouts 37.

In FIG. 11 and FIG. 14, part of the lubricating oil introduced into the oil introducing cutouts 37 enters the outer-diameter-side oil guide grooves 38 that communicate with the oil introducing cutouts 37. Each outer-diameter-side oil guide groove 38 has a shape such that the depth thereof gradually increases toward the corresponding oil introducing cutout 37, and therefore has a large sectional area at an inlet portion thereof communicating with the oil introducing cutout 37. Therefore, much of the lubricating oil introduced into the oil introducing cutouts 37 can be taken into the outer-diameter-side oil guide grooves 38. Further, since the bottom surface (surface facing downward) of each outer-diameter-side oil guide groove 38 is located lower toward the back or inner thereof, the lubricating oil attached near the inlet portion of the outer-diameter-side oil guide groove 38 easily enters the back side of the outer-diameter-side oil guide groove 38 along the bottom surface of the outer-diameter-side oil guide groove 38.

The outer-diameter-side oil guide grooves 38 are formed at the lower surface of the conductor-wire stacking portion 34ba of the outer-diameter-side flange 34b so as to face the upper surfaces of the coil ends 33a of the individual coils 33. The respective outer-diameter-side oil guide grooves 38 communicate with each other via gaps 74A (FIG. 14) formed between the conductor wires 35 each having a circular section. Therefore, the lubricating oil that has entered the outer-diameter-side oil guide grooves 38 is sufficiently spread over the upper surfaces of the coil ends 33a along the gaps 74A, and thus the coil ends 33a are efficiently cooled.

Of the lubricating oil introduced into the oil introducing cutouts 37, the lubricating oil that has not entered the outer-diameter-side oil guide grooves 38 drops through the slit-shaped oil introducing cutouts 37. This dropped lubricating oil is received by the inner-diameter-side flange 34c, and is guided by the inner-diameter-side oil guide grooves 41 formed in the inner-diameter-side flange 34c to reach the lower side of each coil end 33a. The respective inner-diameter-side oil guide grooves 41 communicate with each other via gaps 74B (FIG. 14) formed between the conductor wires 35. Therefore, the lubricating oil that has entered the inner-diameter-side oil guide grooves 41 is sufficiently spread over the lower surfaces of the coil ends 33a along the gaps 74B, and thus the coil ends 33a are efficiently cooled.

As described above, both the upper surfaces and the lower surfaces of the coil ends 33a of the individual coils 33 can be simultaneously cooled by the lubricating oil that has entered the outer-diameter-side oil guide grooves 38 and the lubricating oil that has entered the inner-diameter-side oil guide grooves 41. The lubricating oil that has cooled the upper individual coils 33 is also spread over the lower individual coils 33 along the gaps 74A, 74B, and cools the lower individual coils 33. Thus, the output of the electric motor 1 can be improved.

Also in this vehicle drive device, as shown in FIG. 9, the temperature detector 75 for detecting the temperature of the stator coil 31 is provided in a position that satisfies the conditions 1 to 3 described above. Specifically, the position in which the temperature detector 75 is provided is lower than the axial height h2 (refer to FIG. 2) of the rotor 10, is higher than the oil level 66 of the lubricating oil, and is within the gap 76 between the individual coils 33 adjacent in the circumferential direction, except a portion between the coil ends 33a of the adjacent individual coils 33. The temperature detector 75 disposed at the aforementioned position can accurately detect the substantially highest temperature of the stator coil 31, for the same reasons as described above.

Figure 15:
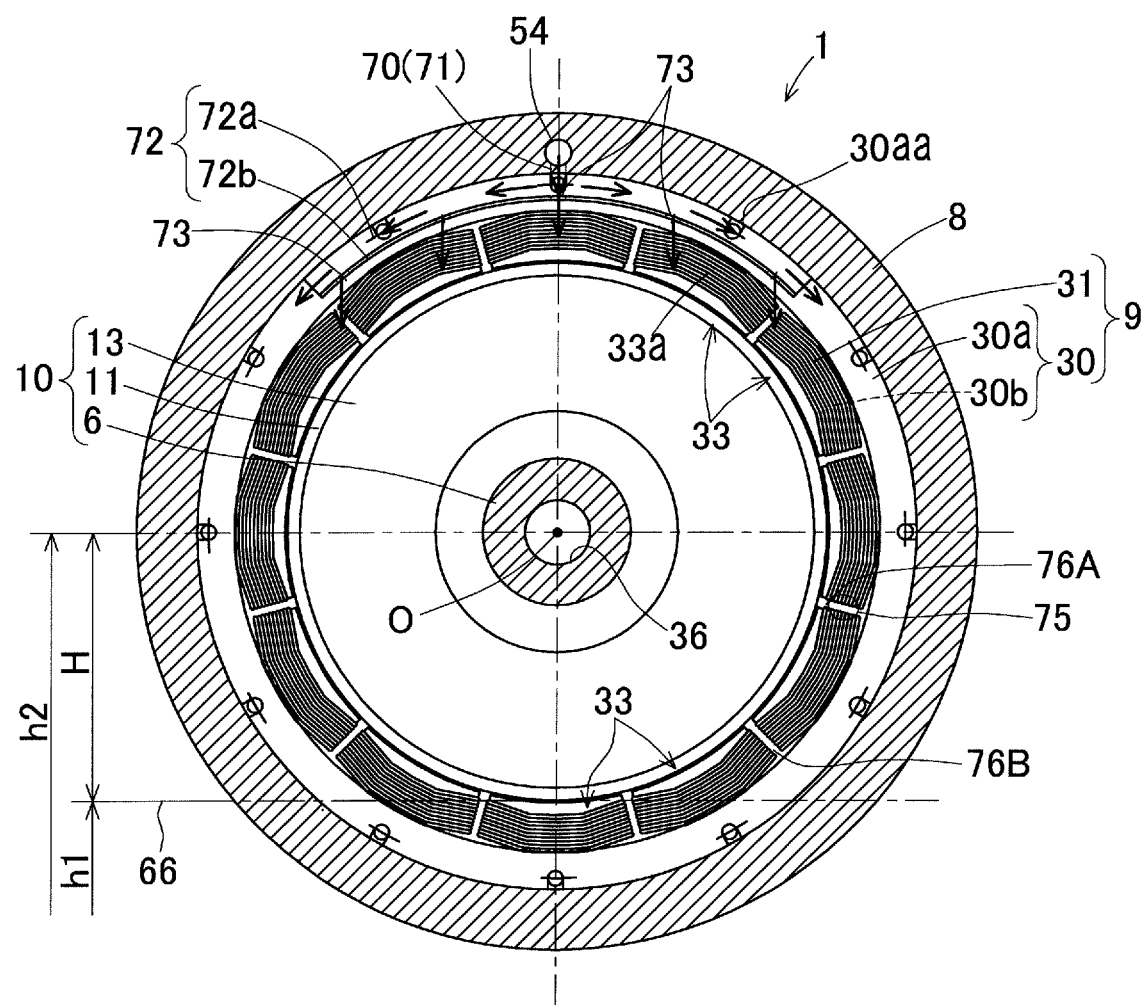
FIG. 15 is a cross-sectional view, as viewed in an axial direction, of an electric motor of a vehicle drive device according to still another embodiment of the present invention.

FIG. 15 shows a vehicle drive device according to still another embodiment of the present invention, in which the number of individual coils 33, in other words, the number of slots, is larger than that in the vehicle drive device shown in FIG. 2. When the number of slots is larger as in this embodiment, more gaps 76 between the individual coils 33 are present between the axial height h2 of the rotor 10 and the oil level height h1. Accordingly, the number of the gaps 76 that satisfy the aforementioned conditions 1 and 2 is increased. However, even in this case, it is desirable that the temperature detector 75 is disposed in a gap 76 between adjacent individual coils 33 that are not immersed in the lubricating oil accumulated in the bottom portion of the motor housing 8. That is, the temperature detector 75 is preferably disposed in a gap 76 between an individual coil 33 that is immediately above an individual coil 33 immersed in the lubricating oil, and an individual coil 33 immediately above this individual coil 33.

In the example shown in FIG. 15, gaps 76A and 76B satisfy the aforementioned conditions 1 and 2. However, of two individual coils 33 at both sides of the gap 76B, the lower individual coil 33 is immersed in the lubricating oil. Meanwhile, none of two individual coils 33 at both sides of the gap 76A are immersed in the lubricating oil. Therefore, the temperature detector 75 is preferably disposed in the gap 76A. The temperature detector 75 disposed as described above can detect the temperature of the highest-temperature individual coil 33 while suppressing the influence of the oil temperature of the individual coils 33 immersed in the lubricating oil.

Figure 16:
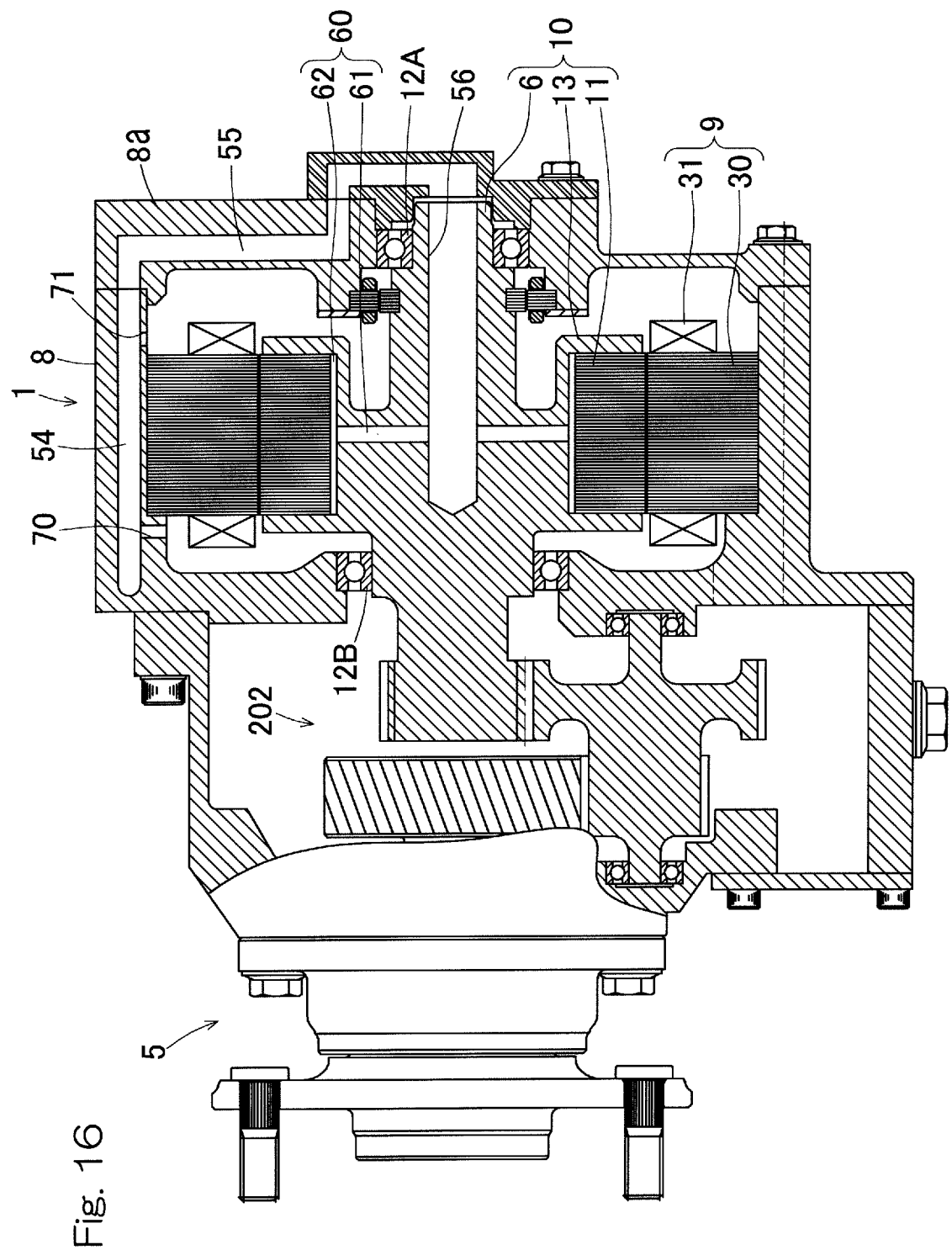
FIG. 16 is a vertical sectional view of a vehicle drive device according to yet another embodiment of the present invention.
Figure 17:
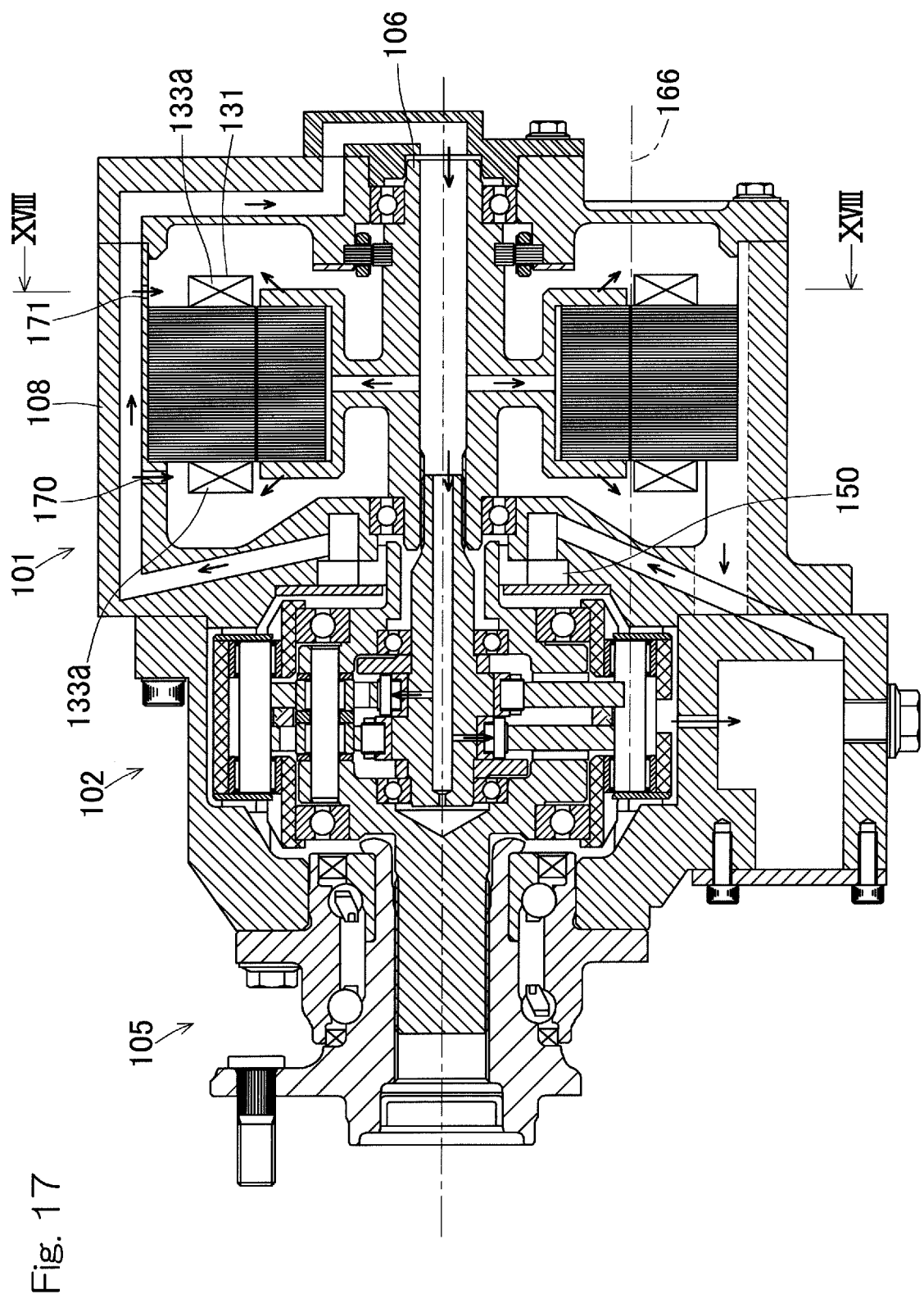
FIG. 17 is a longitudinal sectional view of a first example of an internal circulation type vehicle drive device.
Figure 18:
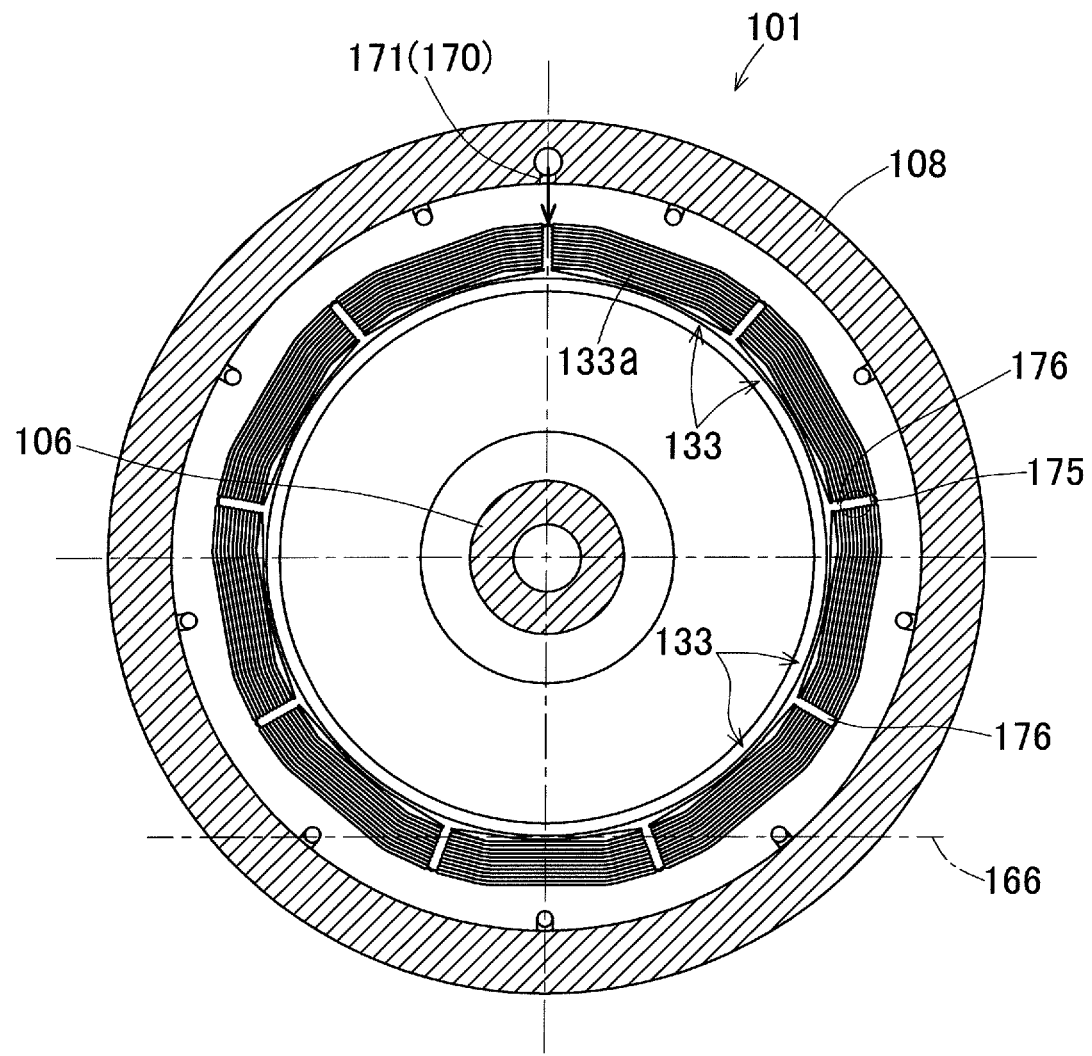
FIG. 18 is a cross-sectional view taken along a line XVIII-XVIII in FIG. 17.
Figure 19:
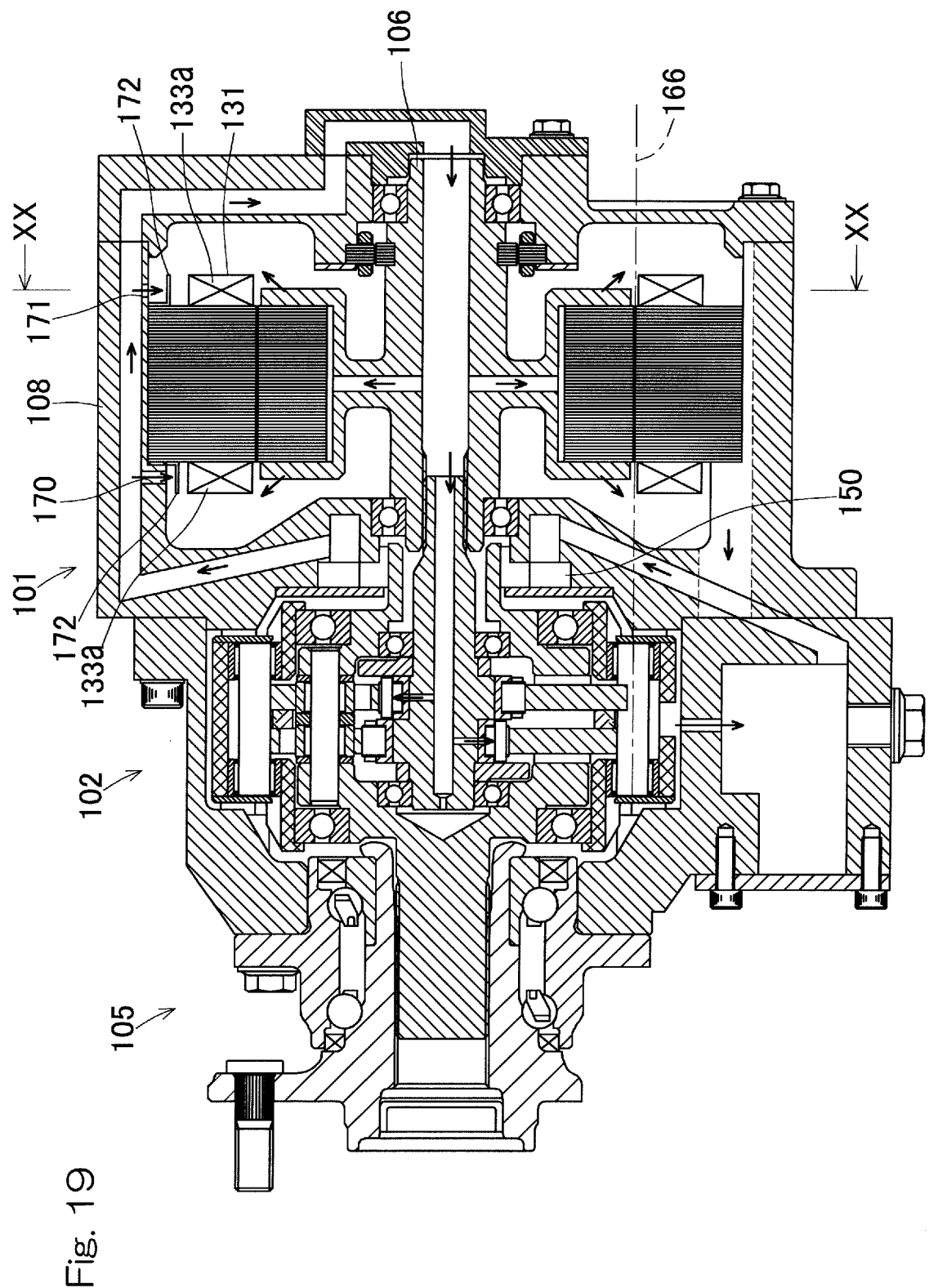
FIG. 19 is a longitudinal sectional view of a second example of the internal circulation type vehicle drive device.
Figure 20:
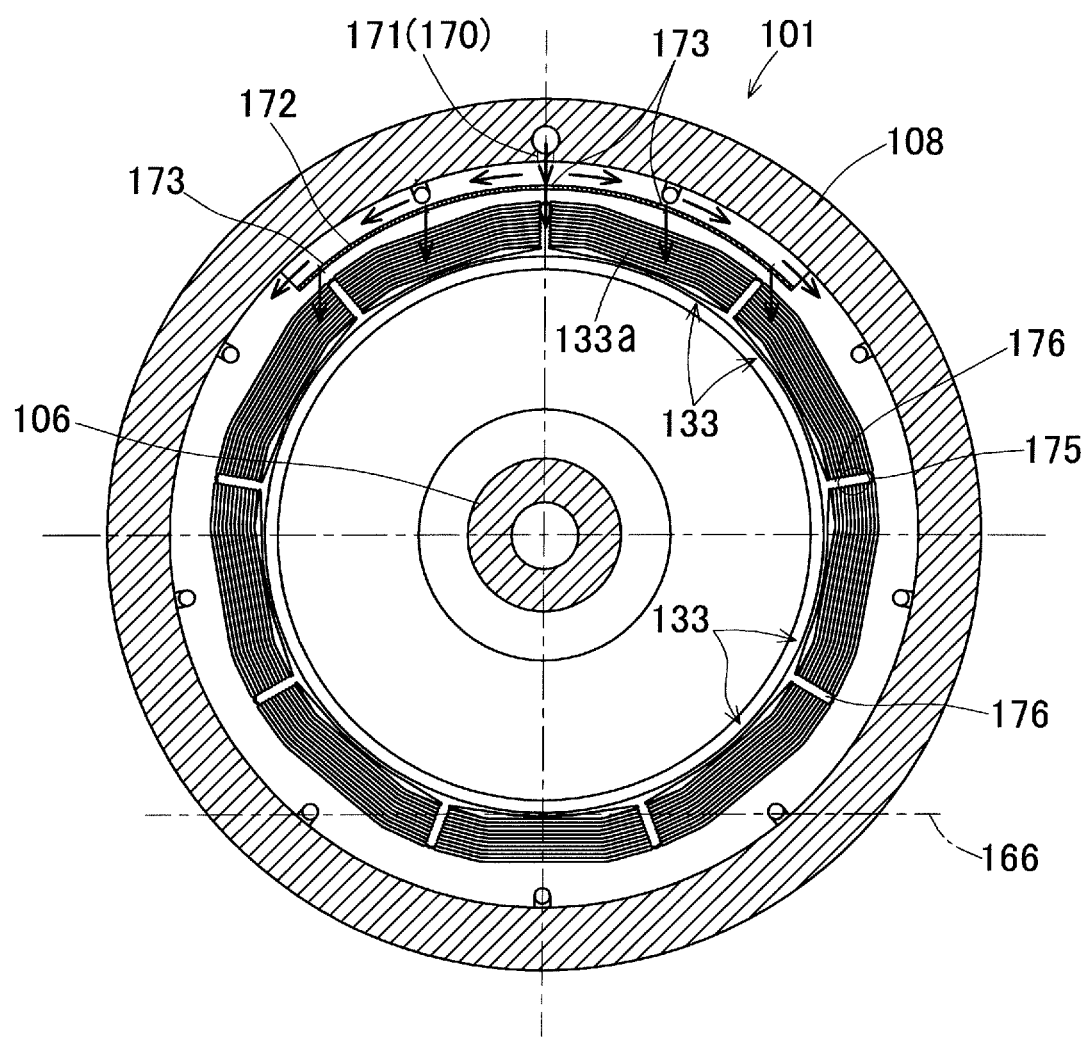
FIG. 20 is a cross-sectional view taken along a line XX-XX in FIG. 19.

FIG. 16 shows a vehicle drive device according to yet another embodiment of the present invention, which is difference from the vehicle drive device shown in FIG. 1 in the structure of the reducer. While the reducer 2 of the vehicle drive device shown in FIG. 1 is a cycloid type reducer, a reducer 202 of the vehicle drive device shown in FIG. 16 is a multistage gear type reducer. Unlike the cycloid type reducer 2, the multistage gear type reducer 202 need not be compulsorily cooled and lubricated, and therefore, oil is supplied to only the electric motor 1. The oil supply mechanism to the electric motor 1 is identical to that of the vehicle drive device shown in FIG. 1. Also in this case, a temperature detector (not shown) for detecting the temperature of the stator coil 31 is disposed in a position similar to that of the vehicle drive device shown in FIG. 1. The other components are the same as those of the vehicle drive device shown in FIG. 1. The same components are designated by the same reference numerals, and the description thereof is omitted.

Although the preferred modes for carrying out the present invention have been described on the basis of the embodiments with reference to the drawings, the embodiments disclosed herein are, in all aspects, illustrative and not restrictive. The scope of the present invention is indicated by claims, not by the above description. Those skilled in the art will readily conceive numerous changes and modifications within the framework of obviousness upon the reading of the specification herein presented of the present invention. Accordingly, such changes and modifications are to be construed as included in the scope of the invention defined by claims or in a scope equivalent thereto.

REFERENCE NUMERALS

- 1 . . . electric motor
- 5 . . . wheel bearing
- 8 . . . housing
- 9 . . . stator
- 10 . . . rotor
- 30 . . . stator core
- 30b . . . tooth
- 31 . . . stator coil
- 33 . . . individual coil
- 33a . . . coil end
- 70, 71 . . . oil hole (lubricating oil supply portion)
- 72 . . . guide plate
- 75 . . . temperature detector
- 76, 76A, 76B . . . gap
- O . . . axis
- K . . . oil supply mechanism

What is claimed is:

1. A vehicle drive device comprising: a wheel bearing configured to support a wheel; a horizontally-mounted electric motor configured to rotate a rotating ring of the wheel bearing; and an oil supply mechanism configured to cool the electric motor with lubricating oil, wherein the electric motor includes a housing, a stator provided inside the housing, and a rotor configured to be rotatable with respect to the stator, the stator is composed of a stator core and a stator coil, the stator core has a plurality of teeth arranged in a circumferential direction around an axis of the rotor, and the stator coil is composed of a plurality of individual coils provided on the respective teeth, the oil supply mechanism has a lubricating oil supply portion configured to supply lubricating oil onto coil ends of upper individual coils among the plurality of individual coils, and a lower portion of the stator is immersed in the lubricating oil accumulated in a bottom portion of the housing, and a temperature detector configured to detect a temperature of the stator coil is disposed at a position that is lower than the axis of the rotor and higher than an oil level of the lubricating oil accumulated in the bottom portion of the housing, wherein the temperature detector is located within a range of a gap between individual coils adjacent in the circumferential direction, and the temperature detector is not located between coil ends of the adjacent individual coils.

2. The vehicle drive device as claimed in claim 1, wherein a lower end of the rotor has a height such that the rotor, in a normal state, is not immersed in the lubricating oil accumulated in the bottom portion of the housing, and the rotor comes into contact with the lubricating oil when the oil level of the lubricating oil varies due to turning or abrupt acceleration/deceleration of a vehicle, and the temperature detector is disposed, in the housing, at a position on a side opposite to a side where the lower end of the rotor moves due to rotation of the rotor when the vehicle travels forward, with respect to the axis of the rotor.

3. The vehicle drive device as claimed in claim 1, wherein the lubricating oil supply portion has an oil hole provided in an upper portion of the housing and configured to discharge the lubricating oil downward, and a guide plate is provided between the oil hole and outer-diameter-side end surfaces of the upper individual coils, the guide plate being configured to distribute, in the circumferential direction, the lubricating oil discharged from the oil hole, and supply the lubricating oil onto the coil ends of the upper individual coils.

4. The vehicle drive device as claimed in claim 1, wherein the temperature detector is covered with an insulating member.

5. The vehicle drive device as claimed in claim 4, wherein the insulating member is made of resin.

* * * * *